US012801255B2

(12) United States Patent
Zhong et al.

(10) Patent No.: US 12,801,255 B2
(45) Date of Patent: Nov. 17, 2026

(54) SPLIT-SCREEN DISPLAY METHOD AND APPARATUS

(71) Applicant: HONOR DEVICE CO., LTD., Shenzhen (CN)

(72) Inventors: Dayou Zhong, Shenzhen (CN); Lu Mao, Shenzhen (CN); Jie Ren, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 294 days.

(21) Appl. No.: 18/713,304

(22) PCT Filed: Sep. 7, 2022

(86) PCT No.: PCT/CN2022/117626

§ 371 (c)(1),
(2) Date: May 24, 2024

(87) PCT Pub. No.: WO2023/098210

PCT Pub. Date: Jun. 8, 2023

(65) Prior Publication Data

US 2025/0021202 A1 Jan. 16, 2025

(30) Foreign Application Priority Data

Nov. 30, 2021 (CN) ......................... 202111450656.X

(51) Int. Cl.
*G06F 3/0481* (2022.01)
*G06F 3/0484* (2022.01)
(Continued)

(52) U.S. Cl.
CPC .......... *G06F 3/0481* (2013.01); *G06F 3/0484* (2013.01); *H04M 1/0241* (2013.01);
(Continued)

(58) Field of Classification Search
CPC ................. G06F 3/0481; G06F 3/0484; G06F 2203/04803; G06F 3/04817; G06F 3/0482;
(Continued)

(56) References Cited

U.S. PATENT DOCUMENTS 9,069,443 B2 6/2015 Kasterstein et al.
9,134,756 B2 9/2015 De Paz
(Continued)

FOREIGN PATENT DOCUMENTS

CN 106484220 A 3/2017
CN 106557230 A 4/2017
(Continued)

*Primary Examiner* — Andrey Belousov

(57) ABSTRACT

A method is: An electronic device displays a first interface of a first application in full screen at a first moment. The electronic device displays split-screen prompt information in the first interface of the first application when a first preset condition is satisfied, where in the split-screen prompt information, an application icon of the first application is located on a left side, an upper side, or an upper left side of an application icon of a second application, a preset graphic and/or preset text are also included in the split-screen prompt information. The electronic device displays a split-screen interface in response to an operation by a user based on the split-screen prompt information, where the split-screen interface includes the first interface of the first application and a second interface of the second application.

20 Claims, 20 Drawing Sheets

(51) Int. Cl.
*H04M 1/02* (2006.01)
*H04M 1/72403* (2021.01)

(52) U.S. Cl.
CPC ..... *H04M 1/0268* (2013.01); *H04M 1/72403* (2021.01); *G06F 2203/04803* (2013.01); *H04M 1/0214* (2013.01)

(58) Field of Classification Search
CPC .. G06F 3/04886; G06F 9/451; G06F 3/04847; H04M 1/0241; H04M 1/0268; H04M 1/72403; H04M 1/0214
See application file for complete search history.

(56) References Cited

U.S. PATENT DOCUMENTS

| | | | |
|---|---|---|---|
| 9,154,722 B1 | 10/2015 | Muniyandi et al. | |
| 2014/0351748 A1 | 11/2014 | Xia et al. | |
| 2020/0042171 A1 | 2/2020 | Tao | |
| 2021/0216176 A1 | 7/2021 | Walkin et al. | |
| 2022/0308753 A1 | 9/2022 | Song et al. | |
| 2025/0130825 A1* | 4/2025 | Liu | G06F 3/0484 |
| 2025/0231673 A1 | 7/2025 | Mo | |

FOREIGN PATENT DOCUMENTS

| | | |
|---|---|---|
| CN | 106775313 A | 5/2017 |
| CN | 106843732 A | 6/2017 |
| CN | 108549519 A | 9/2018 |
| CN | 108614655 A | 10/2018 |
| CN | 109062479 A | 12/2018 |
| CN | 110362244 A | 10/2019 |
| CN | 111381739 A | 7/2020 |
| CN | 111782332 A | 10/2020 |
| CN | 111966252 A | 11/2020 |
| CN | 112181570 A | 1/2021 |
| CN | 112889027 A | 6/2021 |

* cited by examiner

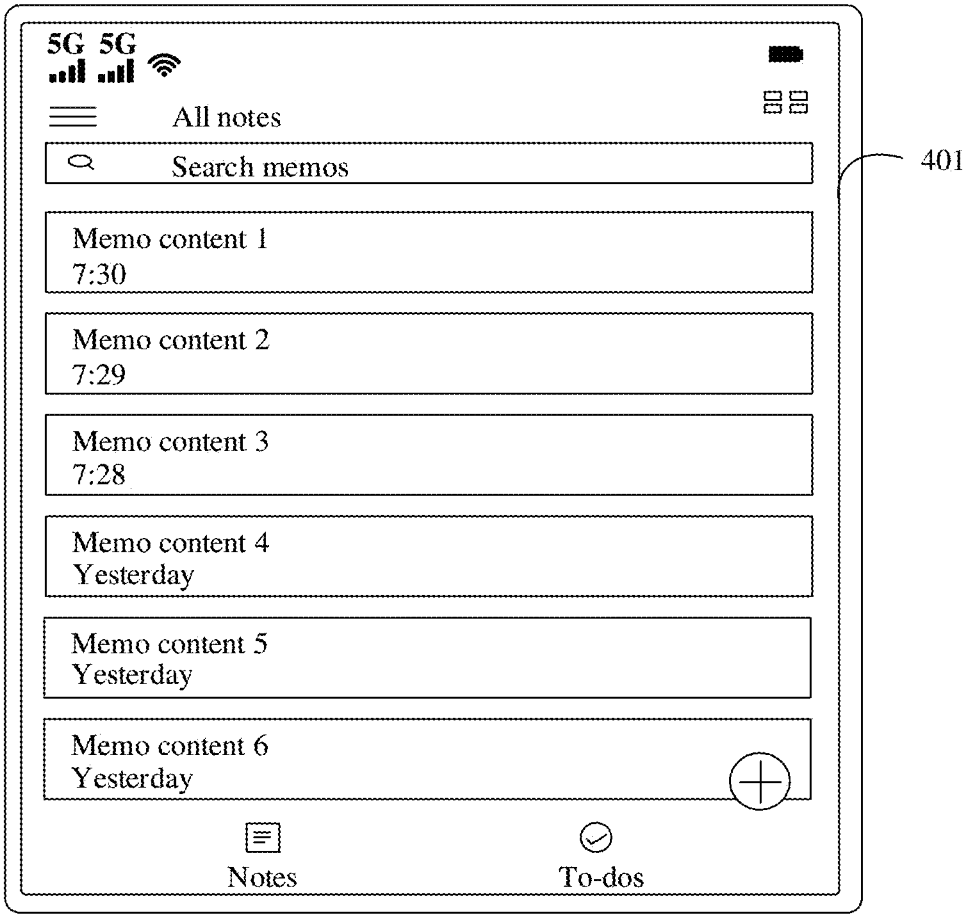
FIG. 4A(1)

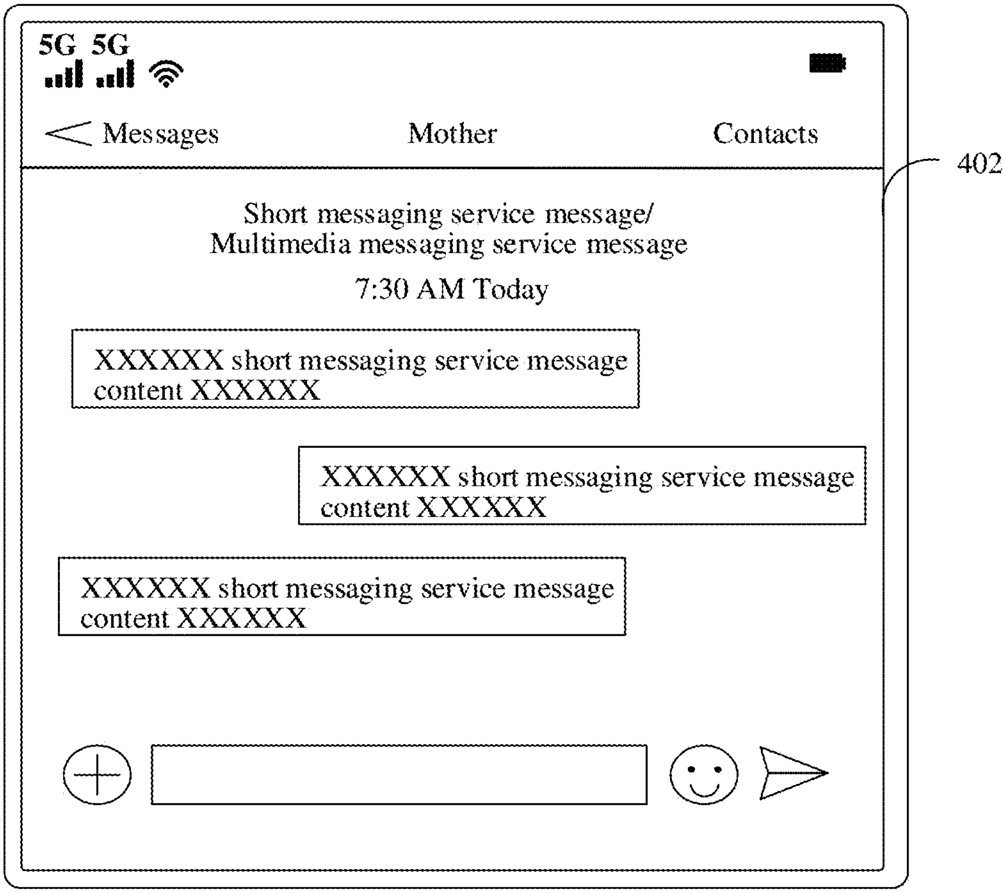
FIG. 4A(2)
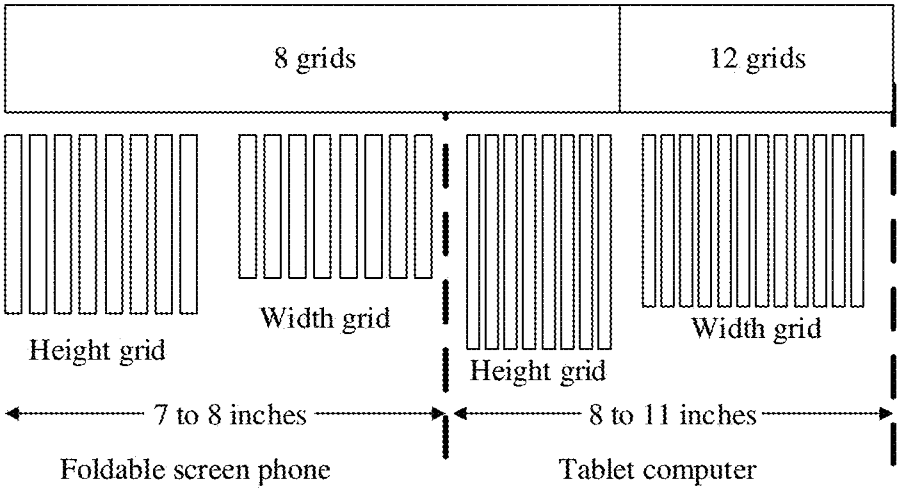
FIG. 4B

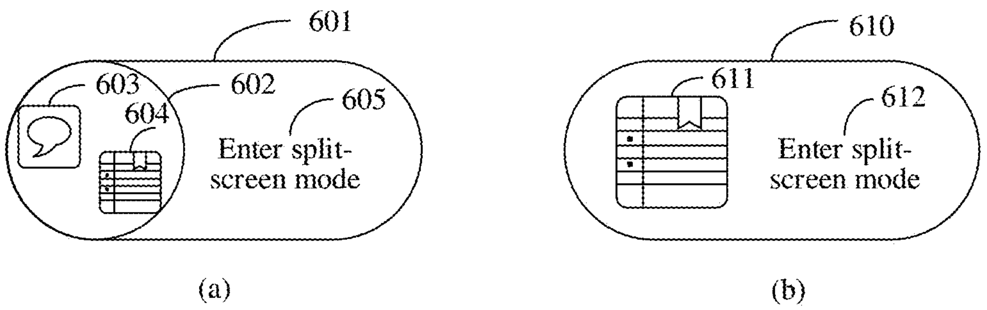
FIG. 6
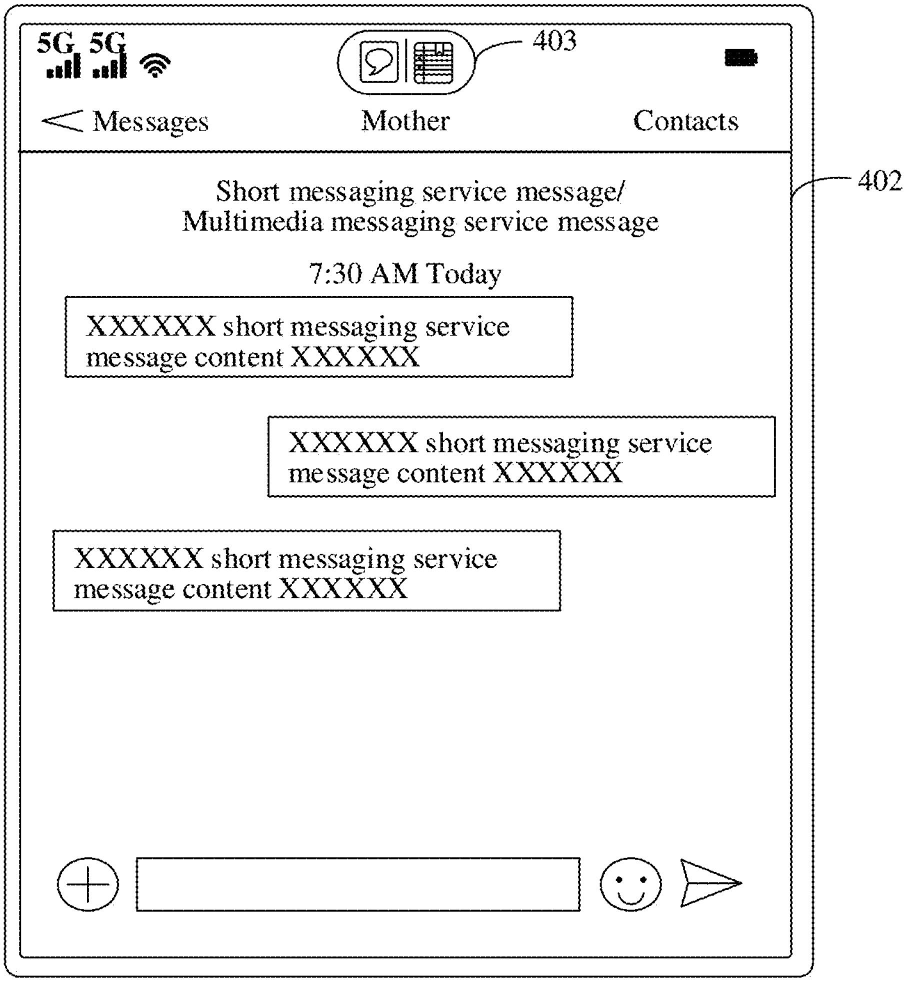
FIG. 7A(1)

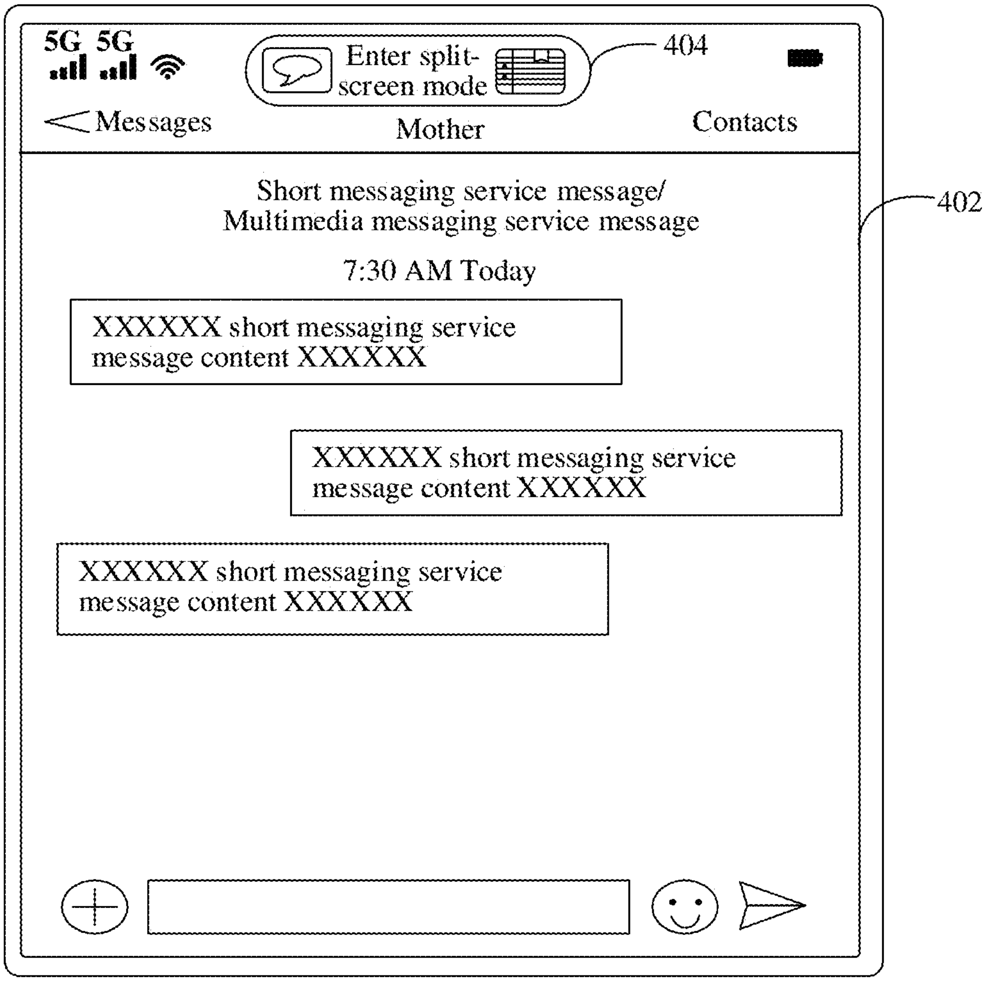
FIG. 7A(2)

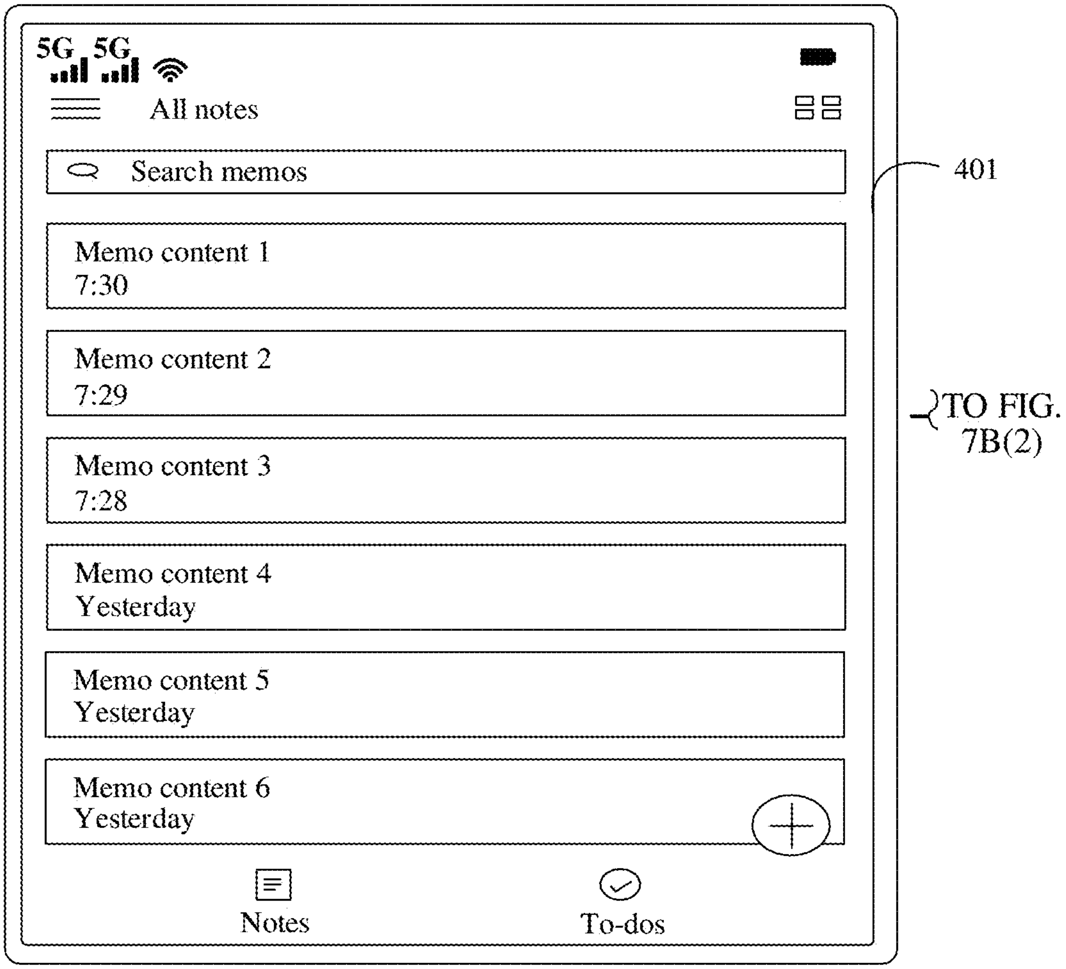
FIG. 7B(1)

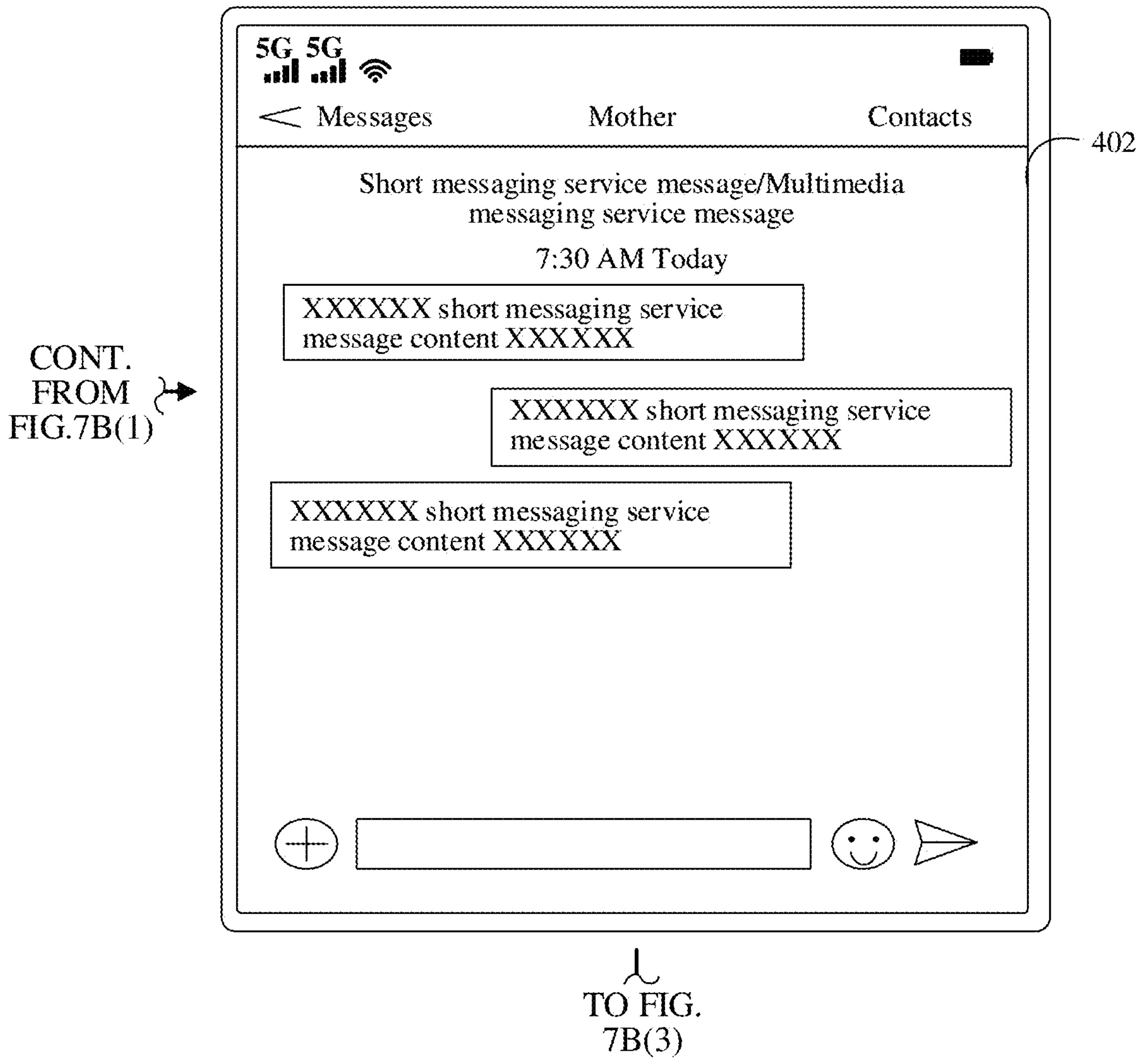
FIG. 7B(2)

CONT.
FROM
FIG.7B(2)
TO
FIG.
7B(4)
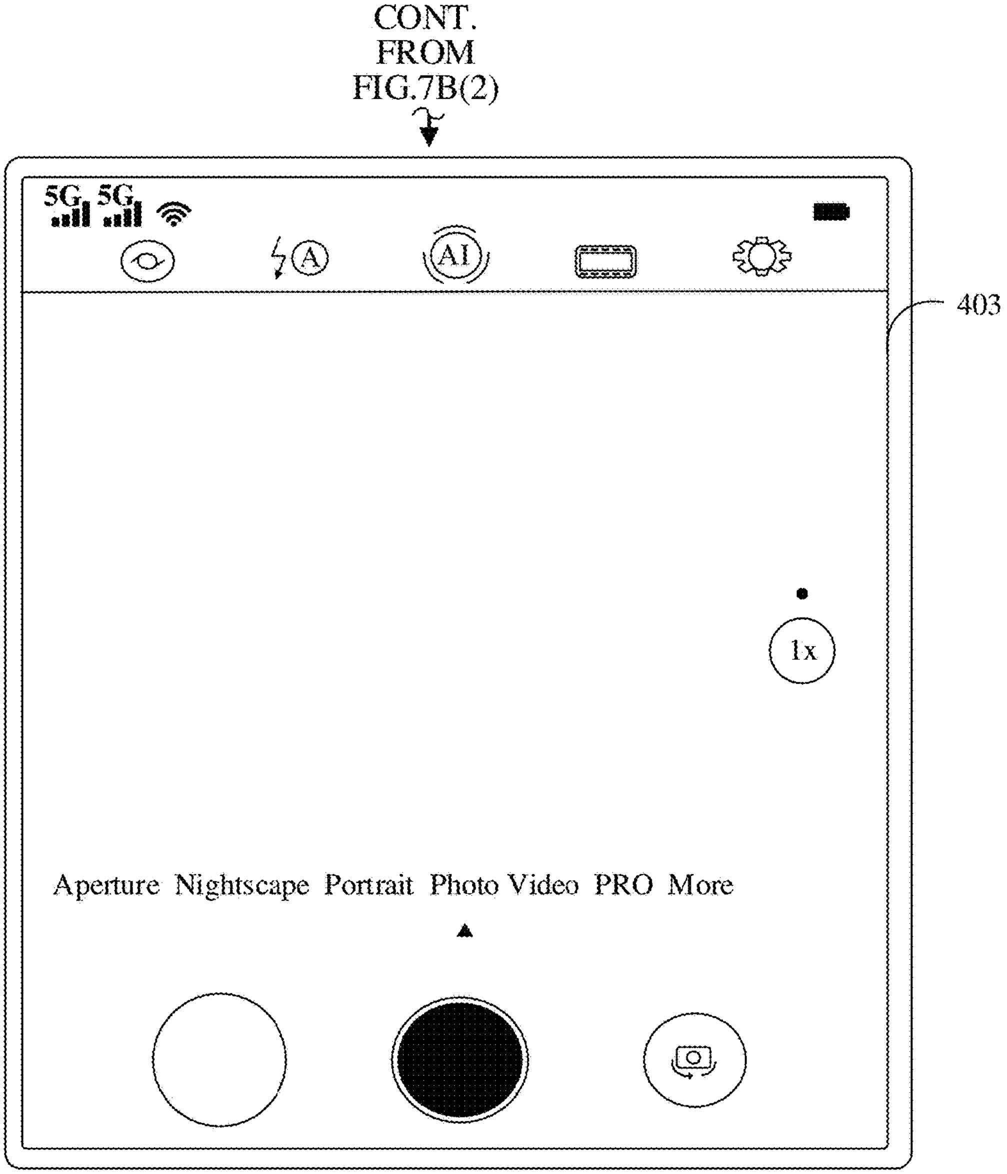
FIG. 7B(3)

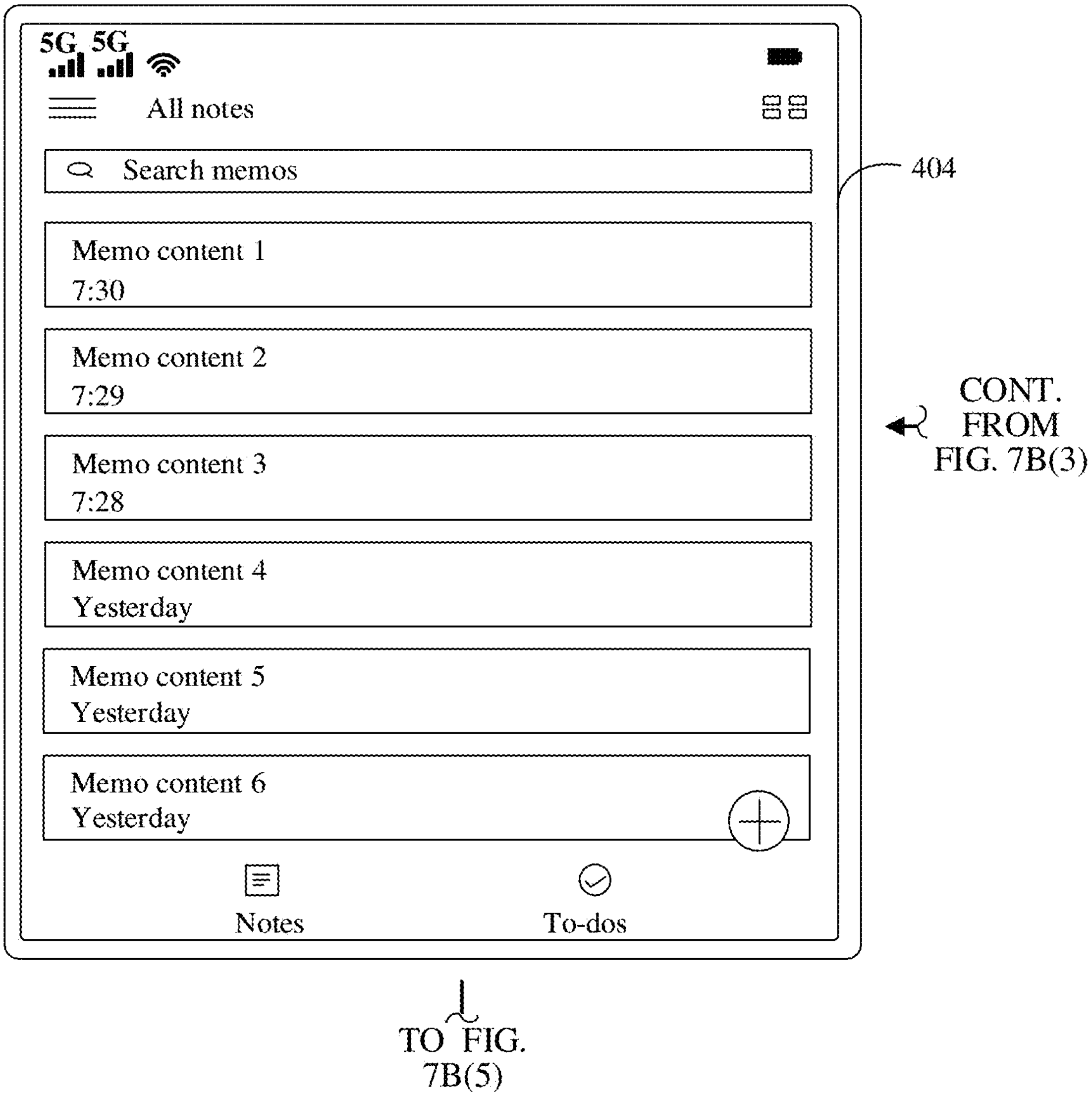
FIG. 7B(4)

CONT.
FROM
FIG. 7B(4)
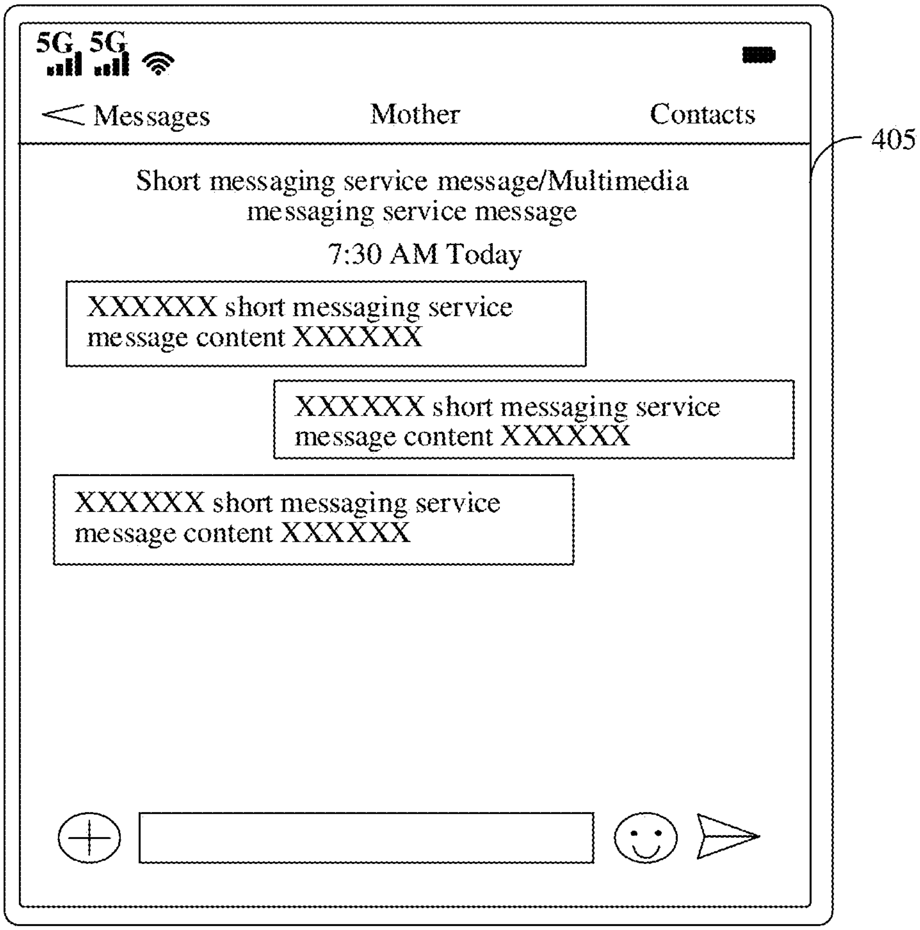
FIG. 7B(5)

SPLIT-SCREEN DISPLAY METHOD AND APPARATUS

CROSS-REFERENCE TO RELATED APPLICATIONS

This application is a national stage of International Application No. PCT/CN2022/117626, filed on Sep. 7, 2022, which claims priority to Chinese Patent Application No. 202111450656.X, filed on Nov. 30, 2021. The disclosures of each of the aforementioned applications are hereby incorporated by reference in their entireties.

TECHNICAL FIELD

This application relates to the field of terminal technologies, and in particular, to a split-screen display method and apparatus.

BACKGROUND

Currently, when using an electronic device (for example, a mobile phone or a tablet computer), a user may switch frequently between two application programs.

When switching between applications, the user usually needs to exit from a current application and then enter another application from a home screen. This operation is very complicated and user experience is poor.

SUMMARY

Embodiments of this application provide a split-screen display method and apparatus. A problem in which a user needs to perform frequent operations for application switching can be resolved and user experience may be improved.

According to a first aspect, some embodiments of this application provide a split-screen display method, including: An electronic device displays a first interface of a first application in full screen at a first moment. The electronic device displays split-screen prompt information in the first interface of the first application when a first preset condition is satisfied, where the split-screen prompt information includes an application icon of the first application and an application icon of a second application: in the split-screen prompt information, the application icon of the first application is located on a left side, an upper side, or an upper left side of the application icon of the second application: a preset graphic and/or preset text are included in the split-screen prompt information: the preset graphic includes a vertical line or an ellipse: the preset text includes "enter split-screen mode" or "split screen": the split-screen prompt information is for prompting split-screen display to be performed on the first application and the second application: the first application is an application running at foreground; and the second application is an application that is recommended by the electronic device and that is for split-screen display performed on the first application. The electronic device displays a split-screen interface in response to an operation by a user based on the split-screen prompt information, where the split-screen interface includes the first interface of the first application and a second interface of the second application.

In this way, the electronic device may prompt the user to perform a split-screen operation by using the split-screen prompt information, so that based on the split-screen prompt information, the user may be informed of two applications on which a split-screen operation is to be performed, and the user may perform an operation based on the split-screen prompt information. Therefore, a split-screen function may be used quickly and easily, a problem in which the user needs to perform frequent operations for application switching is avoided, and user experience may be improved.

In a possible design, in the split-screen prompt information, the application icon of the first application is located on the left side or the upper side of the application icon of the second application, the application icon of the first application and the application icon of the second application are separated by using a first preset graphic or the preset text, and the first preset graphic includes a vertical line. When a type of split-screen display is vertical split-screen display, the application icon of the first application is located on the left side of the application icon of the second application to indicate that the first application (for example, application A) displayed in split screen may be displayed on a left side of the screen and the second application (for example, application B) displayed in split screen may be displayed on a right side of the screen. In this way, user's gaze may be more focused on a left side area (that is, more focused on an interface of an application (the first application) being used before being split), and visual consistency of the user may be met. When a type of split-screen display is horizontal split-screen display, the application icon of the first application is located on the upper side of the application icon of the second application to indicate that the first application (for example, application A) displayed in split screen is displayed on an upper side of the screen and the second application (for example, application B) displayed in split screen is displayed on a lower side of the screen. In this way, user's gaze may be focused on an upper side area (that is, more focused on an interface of an application (the first application) being used before being split), and visual consistency of the user may be met.

In a possible design, in the split-screen prompt information, the application icon of the first application is located on the upper left side of the application icon of the second application, the application icon of the first application and the application icon of the second application are located on a second preset graphic, the second preset graphic includes an ellipse, and a right side of the second preset graphic displays the preset text. That the application icon of the first application is located on the upper left side of the application icon of the second application may prompt the user that the first application (for example, application A) displayed in split screen is displayed on an upper side or a left side of the screen and the second application (for example, application B) displayed in split screen is displayed on a lower side or a right side of the screen. In this way, user's gaze may be more focused on an upper side area or a left side area of the screen (that is, more focused on an interface of an application (the first application) being used before being split), and visual consistency of the user may be met.

In a possible design, that the electronic device displays split-screen prompt information in the first interface of the first application when a first preset condition is satisfied includes: displaying the split-screen prompt information on the currently displayed first interface of the first application in an overlay manner when the second application and a third application are included in a first quantity of consecutive applications, occurring frequency of the first application and occurring frequency of the second application are both greater than or equal to first frequency, and switching frequency between the second application and the first application is greater than or equal to second frequency, where the first quantity of consecutive applications are a first quantity of consecutive applications displayed in full screen within first time before the first moment, and the first quantity of consecutive applications include the first application. In this way, the electronic device can intelligently predict timing for splitting the screen in real time based on user's usage of the application, and recommend split-screen to the user at the timing, so that the user can use the split-screen function quickly and easily based on a split-screen recommendation, thereby improving user experience.

In a possible design, the first time is five minutes, the first frequency is twice, the second frequency is twice, and the first quantity is five.

In a possible design, the first application, the second application, and the third application are all different from an application in a preset blacklist; the application in the blacklist includes Home Screen application; and the split-screen prompt information is displayed in a floating capsule form. The blacklist may also include a setting application.

In a possible design, that the electronic device displays split-screen prompt information in the first interface of the first application when a first preset condition is satisfied includes: displaying an interface of the second application in full screen at a second moment after the first moment in response to switching from the first application to the second application: displaying an interface of a third application in full screen at a third moment after the second moment in response to switching from the second application to the third application; displaying the interface of the second application in full screen at a fourth moment after the third moment in response to switching from the third application to the second application: displaying an interface of the first application in full screen at a fifth moment after the fourth moment in response to switching from the second application to the first application; and displaying the split-screen prompt information in an overlay manner on the first application interface displayed at the fifth moment when a difference between the fifth moment and the first moment is less than or equal to first time, and the first application, the second application, and a current screen all support a screen splitting function. In this way, the electronic device can intelligently predict timing for splitting the screen in real time based on user's usage of the application, and recommend split-screen to the user at the timing, so that the user can use the split-screen function quickly and easily based on a split-screen recommendation, thereby improving user experience.

In a possible design, that the electronic device displays split-screen prompt information in the first interface of the first application when a first preset condition is satisfied includes: displaying an interface of the second application in full screen at a second moment after the first moment in response to switching from the first application to the second application: displaying an interface of a third application in full screen at a third moment after the second moment in response to switching from the second application to the third application: displaying the interface of the second application in full screen at a fourth moment after the third moment in response to switching from the third application to the second application: displaying an interface of the first application in full screen at a fifth moment after the fourth moment in response to switching from the second application to the first application: detecting that the interface of the first application maintains a full screen displayed state at a sixth moment after the fifth moment; and displaying the split-screen prompt information in an overlay manner on the interface of the first application displayed at the sixth moment when a difference between the sixth moment and the first moment is less than or equal to first time, and the first application, the second application, and a current screen all support a screen splitting function. In this way, the electronic device can intelligently predict timing for splitting the screen in real time based on user's usage of the application, and recommend split-screen to the user at the timing, so that the user can use the split-screen function quickly and easily based on a split-screen recommendation, thereby improving user experience.

In a possible design, the electronic device includes a service logic processing module, a context awareness module, a service presentation module, and a multi-window management module, and before that the electronic device displays split-screen prompt information in the first interface of the first application, the method further includes: sending an application switching notification to the service logic processing module when the context awareness module detects an operation that an application is switched by the user, where the application switching notification indicates the user to switch to the first application, the application switching notification includes application information of the first application, and the application information includes a package name and a task identification; adding the first application to an application list based on the application information of the first application by the service logic processing module, where the application list includes application information of an application that has been opened by the user for last N times, each application included in the application list is an application displayed in full screen, and the application list does not include Home Screen application: determining that occurring frequency of the first application and occurring frequency of another application in the application list are greater than or equal to a first preset threshold, where the application list includes application information of the second application: determining that the first application and the second application are applications between which the user recently switches frequently when at least a condition that the occurring frequency of the first application and occurring frequency of the second application are both greater than or equal to the first preset threshold is satisfied: determining by the service logic processing module to perform split-screen display on the two applications between which switching is frequently performed: sending a split-screen instruction to the service presentation module by the service logic processing module, where the split-screen instruction includes application information and split-screen display position information of the two applications between which switching is frequently performed, and the split-screen display position information indicates display position information respectively corresponding to the two applications that are displayed in split screen and between which switching is frequently performed: displaying the split-screen prompt information in the first interface of the first application by the service presentation module; and that the electronic device displays a split-screen interface in response to an operation by a user for the split-screen prompt information includes: notifying the multi-window management module to perform split-screen display on the first application and the second application by the service presentation module in response to detecting the operation by the user for the split-screen prompt information, and performing split-screen display on the first application and the second application by the multi-window management module. In this way, the electronic device can recommend split-screen (that is, display the split-screen prompt information) to the user based on user's usage of the application and based on usage of the application, so that the user can use the split-screen function quickly and easily based on a split-screen recommendation, thereby improving user experience.

In a possible design, the determining by the service logic processing module to perform split-screen display on the two applications between which switching is frequently performed includes: The service logic processing module calls the multi-window management module to determine whether the screen of the electronic device supports a screen splitting function and to determine whether the first application and the second application support the screen splitting function. That the multi-window management module determines whether the screen of the electronic device supports a screen splitting function includes: The multi-window management module obtains a height grid quantity and a width grid quantity corresponding to the screen of the electronic device, determines a device type of the electronic device based on the height grid quantity and the width grid quantity, and determines that the screen of the electronic device supports the screen splitting function if the device type of the electronic device is a preset type, where the preset type includes a foldable screen phone, a tablet computer, and a bar-type mobile phone. That the multi-window management module determines whether the first application and the second application support the screen splitting function includes: The multi-window management module queries whether a white list of the application list includes the first application and the second application, where the white list of the application list indicates all applications that support the screen splitting function, and it is determined that the first application and the second application support the screen splitting function, if the white list of the application list includes the first application and the second application. In this way, the electronic device can recommend split-screen (that is, display the split-screen prompt information) to the user based on user's usage of the application and based on usage of the application, so that the user can use the split-screen function quickly and easily based on a split-screen recommendation, thereby improving user experience.

In a possible design, if it is detected that the user does not perform an operation on the split-screen prompt information for preset duration, the split-screen prompt information disappears: or in response to an operation that the user closes the split-screen prompt information, the split-screen prompt information disappears; or in response to an operation that the user exits from the first interface, the split-screen prompt information disappears; or in response to an operation performed by the user on the split-screen prompt information, the split-screen prompt information disappears. In this way, affecting user experience of using an application may be avoided.

In a possible design, the notifying the multi-window management module to perform split-screen display on the first application and the second application the service presentation module includes: The service presentation module sends split-screen notification information to the multi-window management module, where the split-screen notification information notifies the multi-window management module to perform split-screen display on the first application and the second application, and the split-screen notification information carries package names or task identifications of the first application and the second application. That the multi-window management module performs split-screen display on the first application and the second application includes: The multi-window management module opens an activity corresponding to the first interface of the first application and an activity corresponding to the second interface of the second application, where the second interface is an interface that the user last browsed in the second application.

According to a second aspect, this application provides a chip system. The chip system includes one or more interface circuits and one or more processors. The interface circuit is connected to the processor by using a line.

The chip system may be used in an electronic device including a communication module and a memory. The interface circuit is configured to receive a signal from the memory of the electronic device and send the received signal to the processor, where the signal includes computer instructions stored in the memory. When the processor executes the computer instructions, the electronic device may perform the method according to any one of the first aspect and the possible designs of the first aspect.

Alternatively, the chip system may be used in a server (a server device) including a communication module and a memory. The interface circuit is configured to receive a signal from the memory of the server and send the received signal to the processor, where the signal includes computer instructions stored in the memory. When the processor executes the computer instructions, the server may perform the method according to any one of the first aspect and the possible designs of the first aspect.

According to a third aspect, this application provides a computer-readable storage medium. The computer-readable storage medium includes computer instructions. When the computer instructions are run on an electronic device (for example, a mobile phone), the electronic device is enabled to perform the method according to any one of the first aspect or the possible designs of the first aspect.

Alternatively, when the computer instructions are run on a server, the server is enabled to perform the method according to any one of the first aspect and the possible designs of the first aspect.

According to a fourth aspect, this application provides a computer program product. When the computer program product runs on a computer, the computer is enabled to perform the method according to any one of the first aspect and the possible designs of the first aspect.

According to a fifth aspect, embodiments of this application provide a split-screen display apparatus including a processor, where the processor is coupled to a memory, the memory stores program instructions, and when the program instructions stored in the memory are executed by the processor, the apparatus is enabled to implement the method according to any one of the first aspect and the possible designs of the first aspect. The apparatus may be an electronic device or a server device, or may be a component of an electronic device or a server device, such as a chip.

According to a sixth aspect, embodiments of this application provide a split-screen display apparatus. The apparatus may be divided into different logical units or modules based on functions, and each unit or module performs different functions, to enable the apparatus to perform the method according to any one of the first aspect and the possible designs of the first aspect.

It may be understood that, for beneficial effects that can be achieved by the chip system according to the second aspect, the computer-readable storage medium according to the third aspect, the computer program product according to the fourth aspect, and the apparatus according to the fifth and sixth aspect provided above, refer to the beneficial effects in any one of the first aspect and the possible designs of the first aspect. Details are not described herein.

Based on the split-screen display method provided in embodiments of this application, the electronic device may prompt the user to perform a split-screen operation by using the split-screen prompt information, so that based on the split-screen prompt information, the user may be informed of two applications on which a split-screen operation is to be performed, and the user may perform an operation based on the split-screen prompt information. Therefore, a split-screen function may be used quickly and easily, a problem in which the user needs to perform frequent operations for application switching is avoided, and user experience may be improved.

BRIEF DESCRIPTION OF DRAWINGS

FIG. 4A(1) and FIG. 4A(2) are schematic diagrams of display according to an embodiment of this application:

FIG. 4B is a schematic diagram of a grid according to an embodiment of this application:

FIG. 6 is still another schematic diagram of display according to an embodiment of this application:

FIG. 7A(1) and FIG. 7A(2) are still other schematic diagrams of display according to an embodiment of this application:

FIG. 7B(1) to FIG. 7B(5) are still other schematic diagrams of display according to an embodiment of this application:

DESCRIPTION OF EMBODIMENTS

Figure 1:
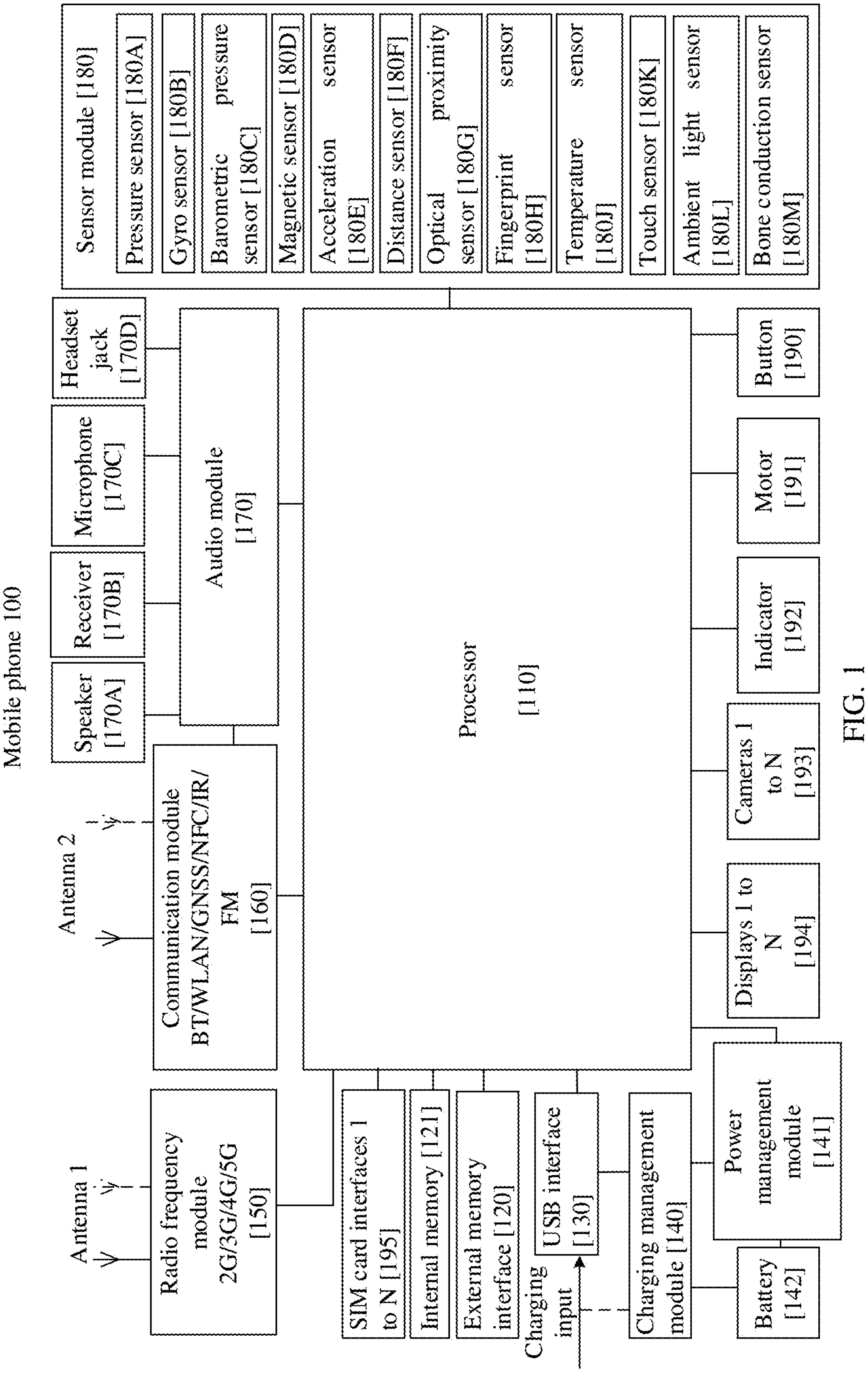
FIG. 1 is a schematic diagram of a structure of an electronic device according to an embodiment of this application.

Currently, when using an electronic device (for example, a mobile phone or a tablet computer), a user may simultaneously open a plurality of application programs and switch between two application programs. For example, the user may reply a short message service message in Messages application while writing a memo in Memo application. When switching between applications, the user usually needs to exit from a current application and then enter another application from a home screen. This operation is very complicated and user experience is poor.

To better meet a requirement of the user, a split-screen function may be provided to the user. In other words, a plurality of (for example, two) applications are simultaneously displayed on a screen, and two applications simultaneously run without affecting each other, thereby preventing the user from switching between the applications back and forth. In conventional technologies, the user needs to perform complex operations to trigger the electronic device to enter a split-screen mode. For example, when the electronic device displays an interface of application A in full screen, the user may touch and hold a task key to enter the split-screen mode (or slide up from a bottom of a mobile phone and stay to enter an interface of a background application widget, and then tap a split-screen icon to enter the split-screen mode), and then the user manually selects another application on which split-screen display needs to be performed. For example, by taping an icon of application B, application A and application B are finally displayed in different windows respectively.

Therefore, in conventional technologies, the user needs to select an application on which screen splitting is to be performed, and needs to perform complex operations to complete a split-screen operation to enable the electronic device to enter a split-screen mode. User experience is not good.

Embodiments of this application provide a split-screen display method and apparatus. When it is detected that switching is frequently performed between a current application (an application running at foreground) and another application, a split-screen prompt may be triggered. Split-screen display may be triggered in response to an operation performed by the user on the split-screen prompt. In this way, complicated operations performed manually by the user is avoided and user experience may be improved.

The split-screen display method provided in embodiments of this application may be applied to an electronic device. For example, the electronic device may be a mobile phone (including a foldable screen phone and a bar-type mobile phone), a tablet computer, a desktop (a desktop computer), a handheld computer, a notebook computer (a laptop computer), an ultra-mobile personal computer (ultra-mobile personal computer, UMPC), a netbook, a personal digital assistant (personal digital assistant, PDA), an augmented reality (augmented reality, AR)\virtual reality (virtual reality, VR) device, or the like. A specific form of the electronic device is not particularly limited in embodiments of this application. Alternatively, the method provided in embodiments of this application is applied to a server device.

As shown in FIG. 1, the electronic device may be specifically a mobile phone 100 The mobile phone 100 may include a processor 110, an external memory interface 120, an internal memory 121, a USB interface 130, a charging management module 140, a power management module 141, a battery 142, an antenna 1, an antenna 2, a radio frequency module 150, a communication module 160, an audio module 170, a speaker 170A, a receiver 170B, a microphone 170C, an headset jack 170D, a sensor module 180, a button 190, a motor 191, an indicator 192, a camera 193, a display 194, an SIM card interface 195, and the like. The sensor module may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices, or may be integrated into a same processor.

The structure shown in embodiments of the present invention does not constitute a limitation on the mobile phone 100. The mobile phone 100 may include more or fewer components than those shown in the figure, or some components may be combined, or some components may be divided, or different component arrangements may be used. The illustrated components may be implemented by hardware, software, or a combination of software and hardware.

A software system of the mobile phone 100 may use a layered architecture, an event-driven architecture, a microkernel architecture, a microservice architecture, or a cloud architecture. In embodiments of the present invention, an Android (Android) system of a layered architecture is used as an example to describe the software structure of the mobile phone 100.

Figure 2:
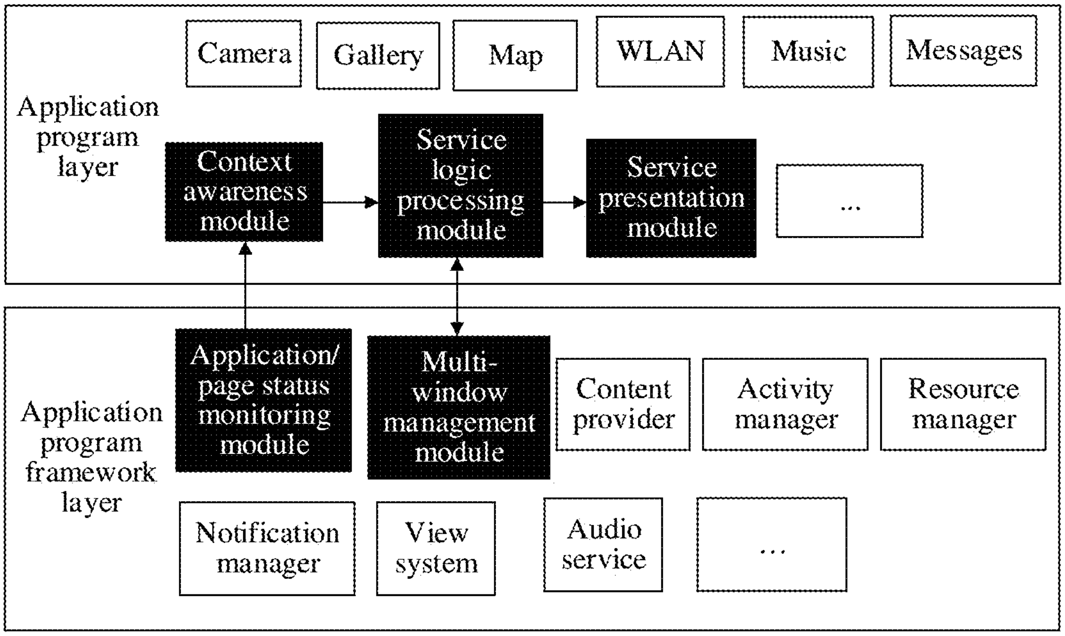
FIG. 2 is a schematic diagram of an architecture of software of an electronic device according to an embodiment of this application.

As shown in FIG. 2, the Android system may include an application program layer (application layer for short) and an application program framework layer (framework layer for short). In addition, the Android system may further include Android runtime, a system library, and a kernel layer (not shown in FIG. 2). This is not limited in this application.

The application program layer may include a series of application program packages. The application program layer may include application programs (application program may be referred to as application for short) such as Camera, Gallery, Calendar, Phone, Map, Navigation, WLAN, Bluetooth, Music, Video, and Messages. This is not limited in embodiments of this application.

In embodiments of this application, the application program layer may further include a context awareness module, a service logic processing module, a service presentation module, and the like. The context awareness module, the service logic processing module, and the service presentation module may be separate APPs, or may be integrated in different APPs respectively, or may be integrated in a same APP. This is not limited in this application.

The context awareness module is configured to sense whether switch is performed on an application. The context awareness module may monitor APP-level and activity-level page switching by using an application/page status monitoring module in the framework layer. When the APP-level page switching occurs, the service logic processing module may be notified that the APP-level page switching occurs.

The service logic processing module is configured for core service calculation, and includes determining two applications between which the user recently switches frequently, deciding whether to perform a split-screen operation on the two applications between which switching is frequently performed, deciding positions of split-screen applications, and the like. The service logic processing module may call a multi-window management module in the application program framework layer to determine whether a screen of the electronic device supports a screen splitting function and to determine whether the two applications between which switching is frequently performed support the screen splitting function. If it is determined that the split-screen operation needs to be performed on the two applications between which switching is frequently performed, the service logic processing module may send split-screen notification information to the service presentation module.

The service presentation module (for example, YOYO Suggestions) is configured for UX interaction and result presentation. The service presentation module can receive the split-screen notification information from the service logic processing module, and perform split-screen floating capsule display. After it is detected that the user taps the split-screen floating capsule, the multi-window management module may be notified to perform a split-screen operation.

The application program framework layer provides an application programming interface (application programming interface, API) and a programming framework for an application program in the application program layer. The application program framework layer includes some predefined functions.

As shown in FIG. 2, the application program framework layer may include the application/page status monitoring module, the multi-window management module (a window manager), a content provider, a view system, a resource manager, a notification manager, and the like. This is not limited in embodiments of this application.

In embodiments of this application, the application/page status monitoring module is configured to monitor the APP-level and activity-level page switching. The APP-level page switching means that the user switches between applications, for example, switches from Messages application to Memo application. The activity-level page switching means that the user switches between pages in an APP, for example, switches from a personal message page to a notification information page in Messages application.

The multi-window management module may be implemented based on Android native multi-window management. Based on an original function of the Android native multi-window management, more capabilities may be provided, such as a split-screen management capability, a floating window management capability, an animated splitting capability, and a capability of being compatible for more applications.

The split-screen management capability is for implementing split-screen display for a plurality of applications. The floating window management capability is for implementing display for a floating window. Animated splitting is for implementing an animation effect from a full-screen mode of a single application to a split-screen display mode of a plurality of applications. The capability of being compatible for more applications may include being compatible for applications such as YOYO Suggestions.

Technical solutions in embodiments of this application are described below with reference to the accompanying drawings in embodiments of this application. In the descriptions of this application, unless otherwise stated, "/" represents an "or" relationship between the associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, unless otherwise stated, "a plurality of" means two or more. "At least one of the following items (pieces)" or similar expressions refer to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In addition, for ease of describing the technical solutions in embodiments of this application clearly, terms such as "first" and "second" are used in embodiments of this application to distinguish between same items or similar items that provide basically same functions and purposes. A person skilled in the art may understand that the terms "first", "second", and the like do not limit a quantity and an execution order, and the terms "first", "second", and the like do not indicate a definite difference. In addition, in embodiments of this application, the terms such as "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, for ease of understanding, use of the terms such as "example" or "for example" is intended to present a relative concept in a specific manner.

For ease of understanding, the split-screen display method provided in embodiments of this application is described below in detail with reference to the accompanying drawings.

Figure 3:
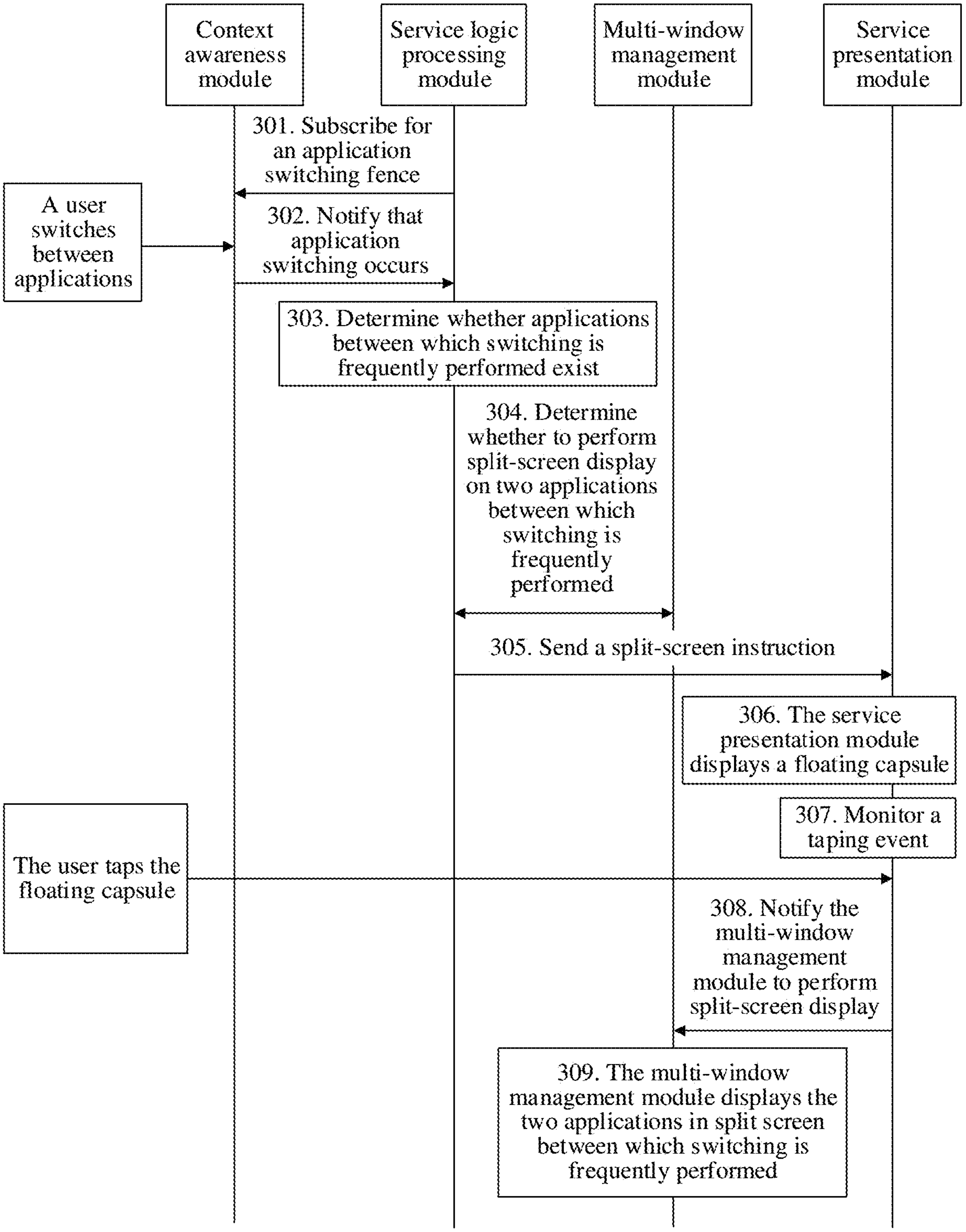
FIG. 3 is a schematic diagram of signal interaction according to an embodiment of this application.

As shown in FIG. 3, embodiments of this application provide a split-screen display method and an example in which an electronic device is a foldable screen phone is used for description. The method includes the following steps.

301. A service logic processing module subscribes for an application switching fence to a context awareness module.

After the service logic processing module subscribes the application switching fence to the context awareness module, and when the context awareness module detects that a user opens an application or switches between applications, the service logic processing module may be notified.

302. The context awareness module detects an operation that an application is switched by the user, and notifies the service logic processing module that application switching occurs.

When the user performs the application switching, the context awareness module may sense the operation that the application is switched by the user, trigger the application switching fence, and send an application switching fence triggering notification to the service logic processing module. The application switching fence triggering notification indicates that the application switching occurs.

For example, at a first moment, as shown in FIG. 4A(1), the mobile phone may display an interface 401 of Memo. Memo is an APP running at foreground at this time. At a second moment (later than the first moment), the user may switch to Messages application, as shown in FIG. 4A(2), and the mobile phone may display an interface 402 of Messages application (Information application). In this case, Messages application is an APP running at foreground. When detecting that the user opens/switches to Messages application, the context awareness module may send an application switching notification (the application switching fence triggering notification) to the service logic processing module. The application switching notification may carry application information of a current application (an application currently running at foreground, such Messages application). The application information includes a package name and a task identification (task identification, task ID). The package name indicates which application the information belongs to, such as Information application or Memo application. The task identification task ID indicates a current displayed interface. Optionally, the application switching notification may also carry time information to open the current application and the like. This is not limited in this application.

303. The service logic processing module determines whether applications between which switching is frequently performed exist.

Each time receiving the application switching notification from the context awareness module, the service logic processing module may read the application information of the current application (the package name and the task ID) from the application switching notification. The current application information is added to a recently used application list based on the application information of the current application. The recently used application list may be determined based on a sliding time window statistical algorithm. For example, the recently used application list may be shown in Table 1.

TABLE 1

| Time | Application identification (package name) |
|---|---|
| 2021 Nov. 10 at 11:00:00 | Package name of application A (for example, com.android.mms) |
| 2021 Nov. 10 at 11:05:00 | Package name of application B (for example, com.android.memo) |
| 2021 Nov. 10 at 11:20:00 | Package name of application A |
| 2021 Nov. 10 at 11:25:00 | Package name of application B |
| 2021 Nov. 10 at 11:36:00 | Package name of application A |

It can be learned from Table 1 that the user enters (opens) application A on 2021 Nov. 10 at 11:00:00, enters application B on 2021 Nov. 10 at 11:05:00, enters application A again on 2021 Nov. 10 at 11:20:00, enters application B again on 2021 Nov. 10 at 11:25:00, and enters application A again on 2021 Nov. 10 at 11:36:00.

A maximum quantity of application information included in the recently used application list may be N (N is a preset positive integer, for example, N=5). When a quantity of application information included in the recently used application list is N (for example, five), it is determined whether the applications on which switching is frequently performed exist in the recently used application list.

In a possible design, it may be counted whether occurring frequency of the application information of the current application (a latest application information added to the application list) and occurring frequency of another application information in the recently used application list are greater than or equal to a first preset threshold (for example, twice). If the occurring frequency of the application information of the current application (for example, application A) and occurring frequency of the application information of another application (for example, application B) are both greater than or equal to the first preset threshold, it is considered that switching is frequently performed between the current application (for example, application A) and the another application (for example, application B).

For example, it is assumed that in five recently used applications, frequency of switching between the current application and the another application back and forth is more than twice. For example, a switching order is application A to application B to application A to application B to application A. It is considered that the switching is frequently performed between the current application (for example, application A) and the another application (for example, application B).

In some embodiments, the service logic processing module may only add application information that is displayed in full screen in last M minutes (for example, five minutes) to the recently used application list. Optionally, duration of full-screen display of an application in the recently used application list may be T seconds (for example, 60 seconds). Application information of an application opened via a floating window (via a small window) may not be added to the recently used application list, and therefore, may not participate in the determining of applications between which switching is frequently performed. Optionally, the application information of Setting application and Home Screen application may also not be added to the recently used application list, and therefore may not participate in the determining of applications between which switching is frequently performed.

In addition, the application information of Home Screen application and Setting application may not be added to the recently used application list, and therefore, may not participate in the determining of applications between which switching is frequently performed. In other words, Home Screen application or Setting application may be removed from an application switching sequence.

In another possible design, if it is determined that the user switches between two applications in full screen (for example, application A and application B) for Y times (where switching from application A to application B counts as one switching, and switching from application B to application A also counts as one switching) within X seconds (for example, 100 seconds, 200 seconds, and 300 seconds), it is considered that the switching is frequently performed between application A and application B. X and Y are configurable system service parameters, for example, X=300 and Y=4.

304. The service logic processing module determines whether to perform split-screen display on two applications between which switching is frequently performed.

The service logic processing module may determine the following two points.

(1) Whether a current screen supports a screen splitting function is determined.

The service logic processing module may call the multi-window management module to determine whether the current screen supports the screen splitting function. In addition, the service logic processing module may register a callback with the multi-window management module. A function of registering the callback is to return a result of whether the current screen supports the screen splitting function to the service logic processing module after the multi-window management module determines whether the current screen supports the screen splitting function.

As shown in FIG. 4B, the multi-window management module may obtain a height grid quantity and a width grid quantity of a screen of the electronic device. When the height grid quantity and the width grid quantity both are eight, it may be determined that the electronic device is a foldable-screen device (a foldable screen phone). A screen size of the foldable screen phone may be 7 to 8 inches. When the height grid quantity and the width grid quantity are 8 and 12 respectively, it may be determined that the electronic device is a tablet computer, and a screen size of the tablet computer may be 8 to 11 inches. If the electronic device is the foldable-screen device or the tablet computer, it is determined that the screen of the electronic device supports the screen splitting function.

Certainly, another type of device also supports the screen splitting function. For example, a bar-type mobile phone also supports the screen splitting function.

(2) Whether two applications (for example, application A and application B) between which switching is frequently performed support screen splitting function (by transmitting package names).

The service logic processing module may call the multi-window management module to determine whether an application (for example, application A and application B) supports the screen splitting function. In addition, the service logic processing module may register a callback with the multi-window management module. A function of registering the callback is to return a result of whether the application supports the screen splitting function to the service logic processing module after the multi-window management module determines whether the application supports the screen splitting function.

The multi-window management module may maintain a white list of an application list. The white list of the application list may include an identification of an application (for example, a package name of the application) that supports the screen splitting function. For example, the white list of the application list that supports the screen splitting function may be shown in Table 2.

TABLE 2

| Application identification (package name) | Support a screen splitting function or not |
|---|---|
| Package name of application A (for example, com.android.mms) | Yes |
| Package name of application B (for example, com.android.memo) | Yes |
| Package name of application C | Yes |
| Package name of application D | Yes |
| Package name of application E | Yes |

The multi-window management module may query whether the white list of the application list includes the two applications (for example, application A and application B) between which switching is frequently performed. If the white list of the application list includes the two applications between which switching is frequently performed, it is determined that the two applications between which switching is frequently performed support the screen splitting function.

If the current screen supports the screen splitting function and both the two applications between which switching is frequently performed support the screen splitting function, step 305 may be performed.

If the current screen does not support the screen splitting function and/or either of the two applications between which switching is frequently performed does not support the screen splitting function, step 305 is not performed and a process is stopped.

305. The service logic processing module sends a split-screen instruction to the service presentation module.

The split-screen instruction may include application information of the two applications between which switching is frequently performed and display position information (split-screen display position information) respectively corresponding to the two applications that are displayed in split screen and between which switching is frequently performed.

The service logic processing module determines a type of split-screen display based on a capability of the current screen. The type of split-screen display may include vertical split-screen display and horizontal split-screen display. After the type of split-screen display is determined, position information (split-screen display position information) respectively corresponding to the two applications in split screen display and between which switching is frequently performed may be determined. When the type of split-screen display is the vertical split-screen display, the service logic processing module may default that a current application (for example, application A) is displayed on a left side and another application (for example, application B) is displayed on a right side. In this way, user's gaze may be focused on a left side area, and visual consistency of the user may be met. When the type of split-screen display is the horizontal split-screen display, the service logic processing module may default that a current application (for example, application A) is displayed on an upper side and another application (for example, application B) is displayed on a lower side. In this way, user's gaze may be focused on an upper side area, and visual consistency of the user may be met.

In a possible design, the service logic processing module may adjust a display position of an application in split-screen display based on a habit of the user. For example, if it is detected that the user is used to placing application B on a left or a top split screen in the split-screen display, application B may be displayed on the left or the top split screen and the current application (for example, application A) is displayed on a right or a top side. Alternatively, if it is detected that the user is used to placing application A on a right (or is used to operating application A by using the right hand) or a lower split screen in the split-screen display, an application (for example, application A) may be displayed on the right or the top side and application B is displayed on a left or a top side.

306. The service presentation module displays a floating capsule.

The service presentation module receives the split-screen instruction from the service logic processing module, and then may display the floating capsule. The floating capsule is for prompting the user to perform split-screen display. The floating capsule (a split-screen floating capsule) may also be referred to as a floating icon (a split-screen floating icon), a floating window (a split-screen floating window), a floating ball (a split-screen floating ball), or a floating notification (a split-screen floating notification). This is not limited in this application.

Display content of the floating capsule may be determined based on information carried in the split-screen instruction. In some embodiments, if the split-screen display position information carried in the split-screen instruction indicates that the current application (for example, application A) is displayed on the left side and another application (for example, application B) is displayed on the right side, the display content of the floating capsule may include an application icon of application A and an application icon of application B, and the application icon of application A is on the left and the application icon of application B is on the right. The application icon of application A and the application icon of application B are separated by a vertical line or separated by text "enter split-screen".

Figure 5A:
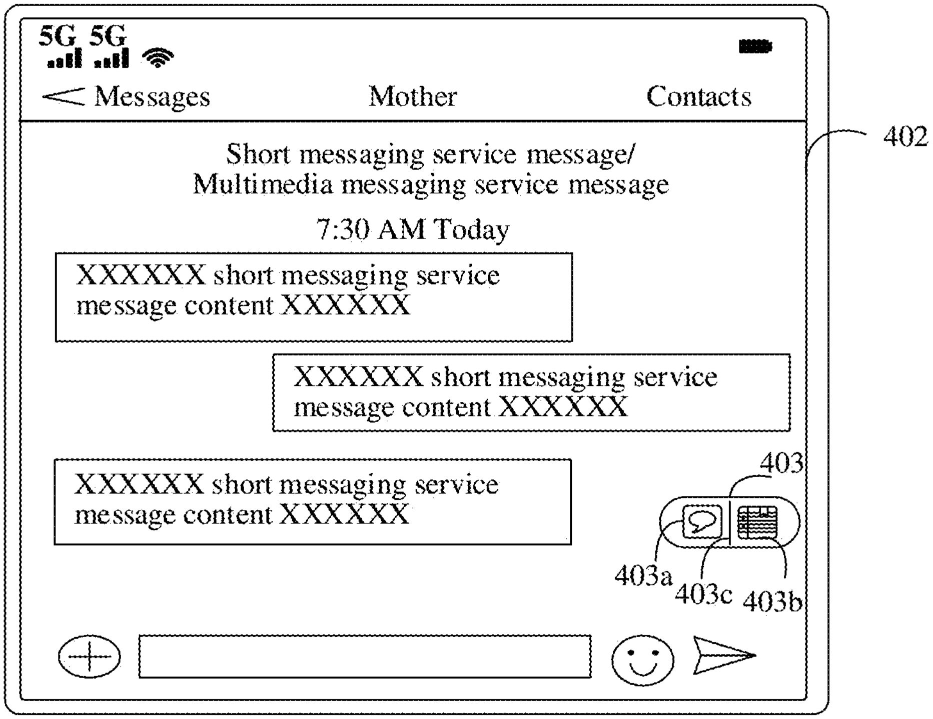
FIG. 5A and FIG. 5B are other schematic diagrams of display according to an embodiment of this application.

As shown in FIG. 5A, if a current application is Messages application, the mobile phone may display a floating capsule 403 on an interface 402 of Messages application. The floating capsule 403 includes an application icon 403*a* of Messages and an application icon 403*b* of Memo (an application in which switching is frequently performed between the application and Messages application). The application icon 403*a* of Messages and the application icon 403*b* of Memo are separated by a vertical line 403*c*. The floating capsule 403 is for prompting the user to perform split-screen display on Messages application and Memo application. The application icon 403*a* of Messages application (the current application) is displayed on a left side of the floating capsule 403, and the application icon 403*b* of Memo application (an application in which switching is frequently performed between the application and the current application) is displayed on a right side of the floating capsule 403.

Figure 5B:
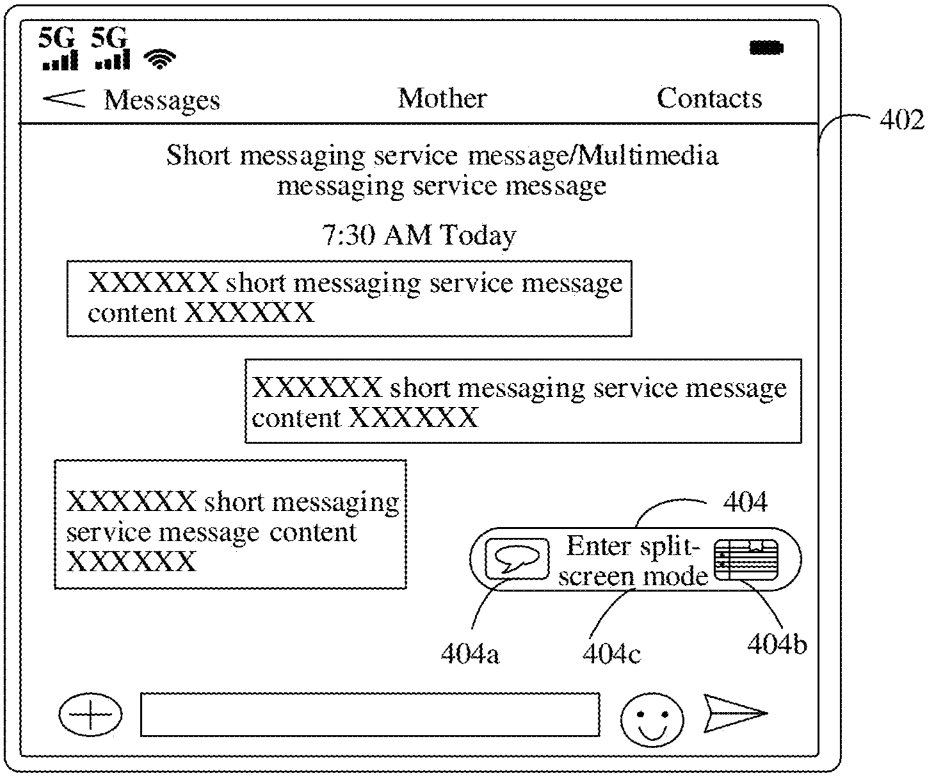

Alternatively, as shown in FIG. 5B, if the current application is Messages application, the mobile phone may display a floating capsule 404 on an interface 402 of Messages application. The floating capsule 404 includes an application icon 404*a* of Messages and an application icon 404*b* of Memo (an application in which switching is frequently performed between the application and Messages application). The application icon 404*a* of Messages and the application icon 404*b* of Memo are separated by text 404*c* "enter split-screen", to intuitively prompt the user to enable a split-screen function. The application icon 404*a* of Messages application (the current application) is displayed on a left side of the floating capsule 404, and the application icon 404*b* of Memo application (an application in which switching is frequently performed between the application and the current application) is displayed on a right side of the floating capsule 404.

The display content of the floating capsule may alternatively be in another form. For example, as shown in (a) in FIG. 6, a circular bubble 602 may be displayed on a left side area of a floating capsule 601. The circular bubble 602 may displays an application icon 603 of Messages (a current application) and an application icon 604 of Memo (an application in which switching is frequently performed between the application and the current application) in a staggered manner. The application icon 603 of Messages application may be displayed on an upper left side of the application icon 604 of Memo application (the application icon 604 of Memo application may be displayed on a lower right side of the application icon 603 of Messages application). Prompt text "enter split-screen" 605 may be displayed on a right side of the floating capsule 601.

For another example, as shown in (b) in FIG. 6, a left side of a floating capsule 610 may display only an application icon 611 of Memo (an application in which switching is frequently performed between the application and a current application), and prompt words "enter split-screen" 612 may be displayed a right side of the floating capsule 610 to prompt the user to perform split-screen display on Messages (the current application) and Memo (the application in which switching is frequently performed between the application and the current application).

It should be noted that, a display position of the floating capsule on a screen may be floated on a side (an upper side, a lower side, a left side, or a right side) of a full-screen window of the current application, displayed on a side dock, displayed upper side of a floating ball, or placed on a lower side of a banner notification, a notification card, a notification center, a floating navigation button, or the like. This is not limited in this application.

For example, as shown in FIG. 7A(1), the mobile phone may display a floating capsule 403 on an upper side of an interface 402 of a current application. For the display content of the floating capsule, refer to related descriptions in FIG. 5A. Details are not described herein again. For another example, as shown in FIG. 7A(2), the mobile phone may display a floating capsule 404 on an upper side of an interface 402 of a current application. For the display content of the floating capsule, refer to related descriptions in FIG. 5B. Details are not described herein again.

In a possible design, only after the user enters the current application and stays for preset duration (for example, three seconds), display of the floating capsule is triggered. For example, as shown in FIG. 5A, only when the user opens Messages application and stays for at least three seconds, the mobile phone displays the floating capsule 403.

In a possible design, split-screen prompt information is displayed on the currently displayed first interface of the first application in an overlay manner when a second application and a third application are included in a first quantity of consecutive applications, occurring frequency of the first application and occurring frequency of the second application are both greater than or equal to first frequency, and switching frequency between the second application and the first application is greater than or equal to second frequency, where the first quantity of consecutive applications are a first quantity of consecutive applications displayed in full screen within first time before the first moment, and the first quantity of consecutive applications include the first application. For example, the first time may be five minutes, the first frequency may be twice, the second frequency may be twice, and the first quantity may be five.

For example, it is assumed that in five recently used applications, a switching order is application A (the first application) to application B (the second application) to application C (the third application) to application A to application B. Alternatively, a switching order is application A to application C to application B to application A to application B. It is considered that switching is frequently performed between the first application (application A) and the second application (application B), and the split-screen prompt information is displayed in the overlay manner on the currently displayed first interface of the first application.

In another possible design, the electronic device displays a first interface of the first application in full screen at the first moment, displays an interface of the second application in full screen at a second moment after the first moment in response to switching from the first application to the second application, displays an interface of the third application in full screen at a third moment after the second moment in response to switching from the second application to the third application, displays the interface of the second application in full screen at a fourth moment after the third moment in response to switching from the third application to the second application, displays an interface of the first application in full screen at a fifth moment after the fourth moment in response to switching from the second application to the first application, and displays the split-screen prompt information in an overlay manner on the first application interface displayed at the fifth moment when a difference between the fifth moment and the first moment is less than or equal to the first time, and the first application, the second application, and a current screen all support a screen splitting function.

For example, as shown in FIG. 7B(1), it is assumed that at moment t1, the mobile phone displays an interface 401 of Memo application in full screen. Then, at moment t2 after the interface of Memo application is displayed, as shown in FIG. 7B(2), the user switches from Memo application to Information application, and a mobile phone screen displays an interface 402 of Information application in full screen. Next, at moment t3 after the interface 402 of the information application is displayed in full screen, as shown in FIG. 7B(3), the user switches from the information application to a camera application, and the electronic device screen displays an interface 403 of the camera application in full screen. Then, at moment t4 after the interface of Camera application is displayed in full screen, as shown in FIG. 7B(4), the user switches from the camera application to Memo application, and the electronic device screen displays an interface 404 of Memo application in full screen. Then, at moment t5 after moment t4, as shown in FIG. 7B(5), the user switches from Memo application to Information application, and the electronic device screen displays an interface 405 of Information application in full screen. In addition, at moment t5, if the electronic device determines that a difference between moment t5 and moment t1 is less than or equal to the first time, Information application, Memo application and Camera application are not applications in a preset blacklist, both Information application and Memo application support a screen splitting function, and the electronic device also supports the screen splitting function, the electronic device determines that Information application and Memo application are applications between which switching is frequently performed, so that the electronic device displays the floating capsule in the overlay manner on the interface of Information application displayed at moment t5.

In embodiments of this application, the electronic device immediately performs a split screen prediction at moment t5, and when it is predicted that a split-screen operation needs to be performed, the floating capsule is immediately displayed on the interface of Memo application that is displayed in full screen at moment t5. In this way, the user may quickly enter a split-screen status by using an operation on the floating capsule.

In embodiments of this application, the user does not need to consider whether to perform a split-screen operation in advance, and does not need to pre-configure the split screen status. This not only saves energy and time for the user, but also reduces an operation step by the user, so that the screen splitting function of the electronic device may be easily and conveniently used by the user.

In an example, the first time may be five minutes. Certainly, in embodiments of this application, a specific value of the first time is not limited, and the specific value of the first time may be adjusted based on a usage requirement.

In still another possible design, the electronic device displays a first interface of the first application in full screen at the first moment, displays an interface of the second application in full screen at a second moment after the first moment in response to switching from the first application to the second application, displays an interface of a third application in full screen at a third moment after the second moment in response to switching from the second application to the third application, displays the interface of the second application in full screen at a fourth moment after the third moment in response to switching from the third application to the second application, displays an interface of the first application in full screen at a fifth moment after the fourth moment in response to switching from the second application to the first application, detects that the interface of the first application maintains a full screen displayed state at a sixth moment after the fifth moment, and displays the split-screen prompt information in an overlay manner on the first application interface displayed at the sixth moment when a difference between the sixth moment and the first moment is less than or equal to a first time, and the first application, the second application, and a current screen all support a screen splitting function.

Refer to FIG. 7B(5). After an interface 405 of an information application is displayed, after target time, for example, the target time may be three seconds, at moment t6 after moment t5 (where an interval between moment t5 and moment t6 is the three seconds), if the interface of the information application shown in FIG. 7B(5) still maintains the full screen displayed state at this time, the electronic device enables a split-screen prediction. To be specific, at moment t6, if the electronic device determines that a difference between moment t6 and moment t1 is less than or equal to the first time, Information application, Memo application, and Camera application are not applications in a preset blacklist, Information application and Memo application support a screen splitting function, and the electronic device also supports the screen splitting function, the electronic device determines that Information application and Memo application are applications between which switching is frequently performed, so that the electronic device displays the floating capsule in the overlay manner on the interface of Memo application displayed at moment t6.

The blacklist may include an application that is infrequently used by the user such as Setting application, and an application that the user needs to use in a process of switching between applications, such as Home Screen application. The application in the blacklist may be pre-configured. Based on a usage habit or purpose of the user, it is determined that the application in the blacklist is an application on which a split-screen operation does not need to be performed. By removing the application from applications on which the split-screen operation needs to be performed, the electronic device may accurately determine split-screen timing, so that the electronic device can recommend the split-screen operation for the user when the user really needs to perform the split-screen operation and user experience is improved. t1<t2<t3<t4<t5<t6.

In embodiments of this application, the electronic device does not perform the split-screen prediction immediately at moment t5, but waits for a period of time (the target time) and then performs the split-screen prediction when detecting that Memo application maintains the full-screen display state. In this way, it may be ensured that the switching to a current application (in this example, Memo application) is a true intention of the user and not an unintentional operation of the user, thereby performing an accurate split-screen prediction. In embodiments of this application, the floating capsule is displayed on the interface of Information application displayed in full screen at moment t6, when it is predicted that the split-screen operation needs to be performed. In this way, the user may quickly enter a split-screen status by using an operation on the floating capsule.

In some cases, due to a touch error or another reason, the user may switch to an application interface by mistake, and then often exit the application interface quickly. Switching in this case is not the true intention of the user. If a split-screen recommendation is triggered in this case, the split screen recommendation may be made at inappropriate timing, bringing poor experience to the user. In embodiments of this application, by waiting for the target time and then performing the split-screen prediction, misunderstanding intention of the user to switch between applications may be avoided and an accurate split-screen prediction is performed.

307. The service presentation module monitors a taping event.

After displaying the floating capsule, the service presentation module may monitor the taping event. If a floating capsule taping event occurs within preset duration (for example, five seconds) for displaying the floating capsule, the split-screen operation is triggered. In other words, steps 308 and 309 are performed.

If it is detected that the user does not tap the floating capsule within the preset duration, the floating capsule may be automatically closed (the floating capsule automatically disappears) to avoid affecting user experience of using an application. Certainly, the user may also manually close the floating capsule by using a preset gesture (for example, a drag and drop gesture or a slide gesture).

In addition, the floating capsule may also disappear automatically when the user exits a current page, or disappear naturally when the user taps the floating capsule to enter a split-screen mode.

308. The service presentation module notifies the multi-window management module to perform split-screen display in response to detecting that the user taps the floating capsule.

The service presentation module may call a system split-screen capability, to be specific, send split-screen notification information to the multi-window management module. The split-screen notification information notifies the multi-window management module to perform the split-screen operation on two applications (for example, application A and application B) between which switching is frequently performed. The split-screen notification information may carry package names or task IDs of the two applications (for example, application A and application B) between which switching is frequently performed.

309. The multi-window management module displays the two applications in split screen between which switching is frequently performed.

After receiving the split-screen notification information, the multi-window management module may simultaneously open an activity corresponding to an interface (the first interface) that the user recently browsed in application A and an activity corresponding to an interface (the second interface) that the user recently browsed in application B (open application A and application B). In this way, display interfaces of application A and application B may be displayed on a display interface simultaneously, to implement one-tap splitting.

Figure 8A:
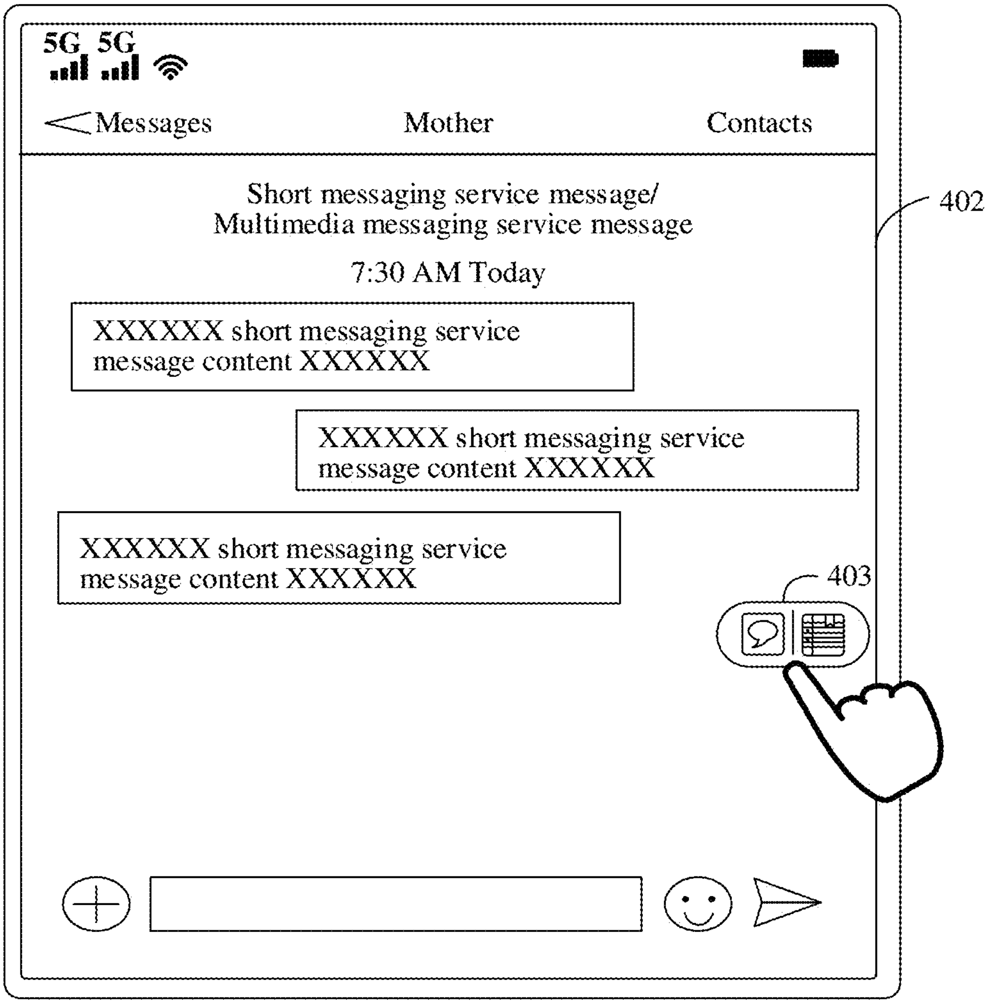
FIG. 8A and FIG. 8B are still other schematic diagrams of display according to an embodiment of this application.
Figure 8B:
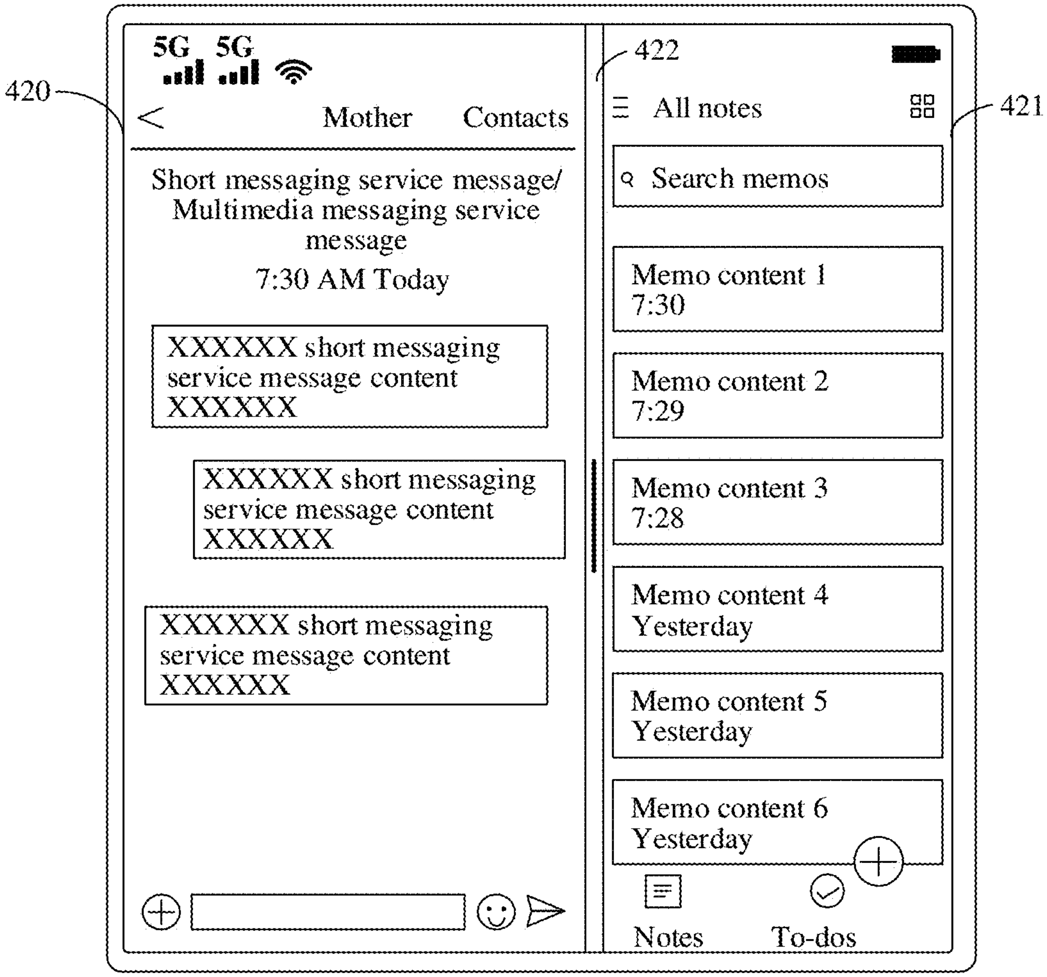

As shown in FIG. 8A, in response to an operation that a floating capsule 403 is tapped by the user on an interface 402 of Messages application, as shown in FIG. 8B, the mobile phone may perform split-screen display on Messages application (a current application) and Memo application (an application in which switching is frequently performed between the application and the current application). The interface 420 of Messages application (the current application) may be displayed on a left side of a mobile phone screen, and an interface 421 of Memo application (the application in which switching is frequently performed between the application and the current application) may be displayed a right side of the mobile phone screen. The interface 420 of Messages application and the interface 421 of Memo application may be separated by a splitting bar 422. Respective display positions of the interface 420 of Messages application and the interface 421 of Memo application on the mobile phone screen correspond to positions of an application icon of Messages application and an application icon of Memo application in the floating capsule. In other words, when the application icon of Messages application in the floating capsule is on a left side, the interface of Messages application is displayed on the left side of the mobile phone screen when split-screen display is performed. When the application icon of Memo application in the floating capsule is on a right side, the interface of Memo application is displayed on the right side of the mobile phone screen when split-screen display is performed.

Figure 9A:
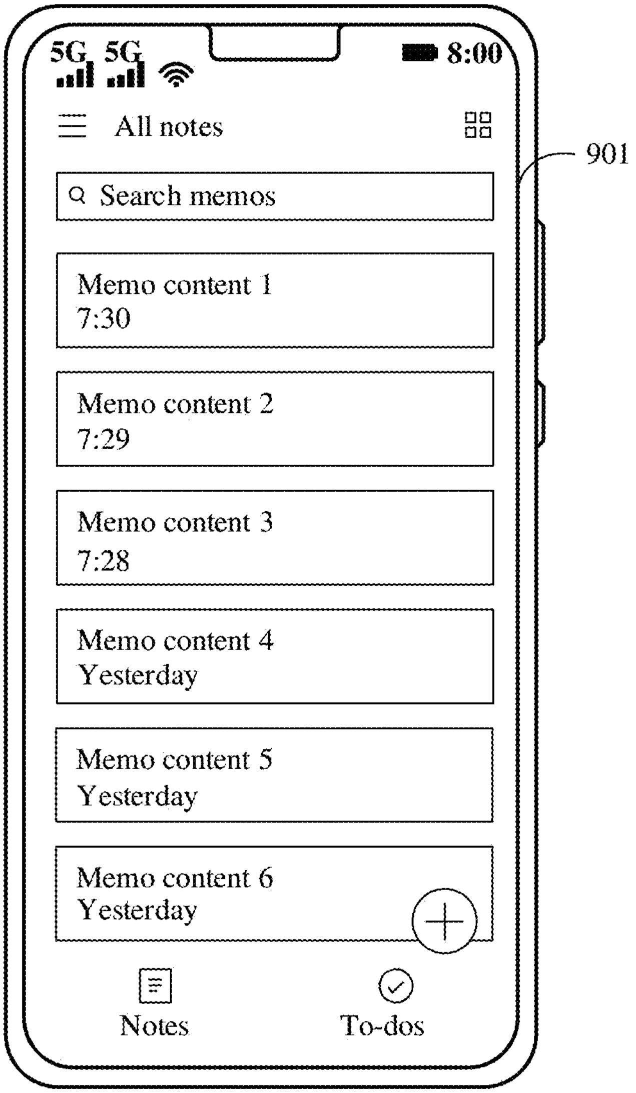
FIG. 9A to FIG. 9D are still other schematic diagrams of display according to an embodiment of this application.
Figure 9B:
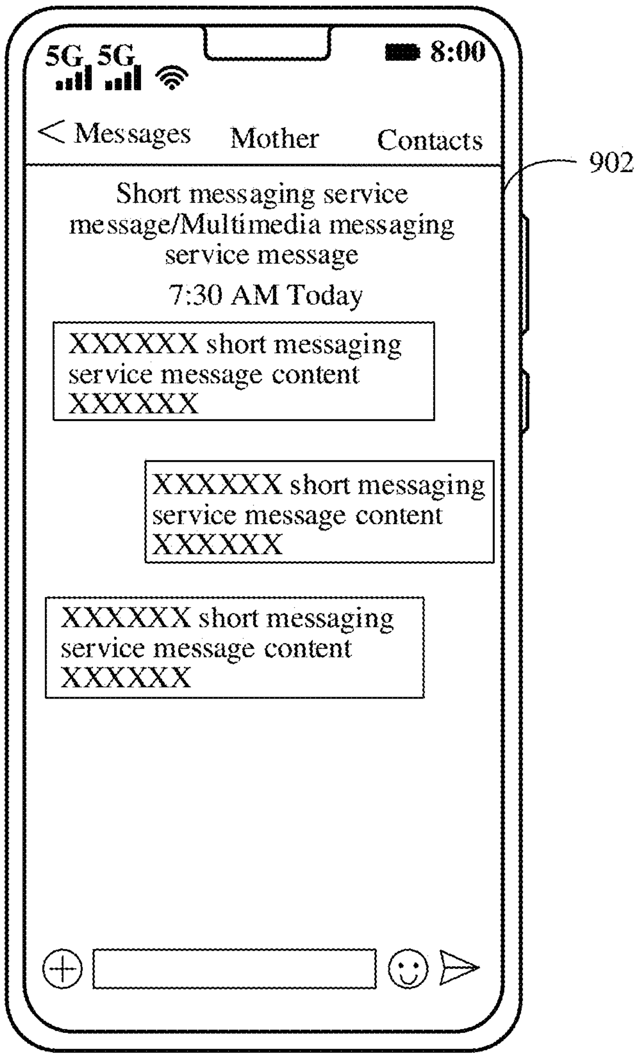
Figure 9C:
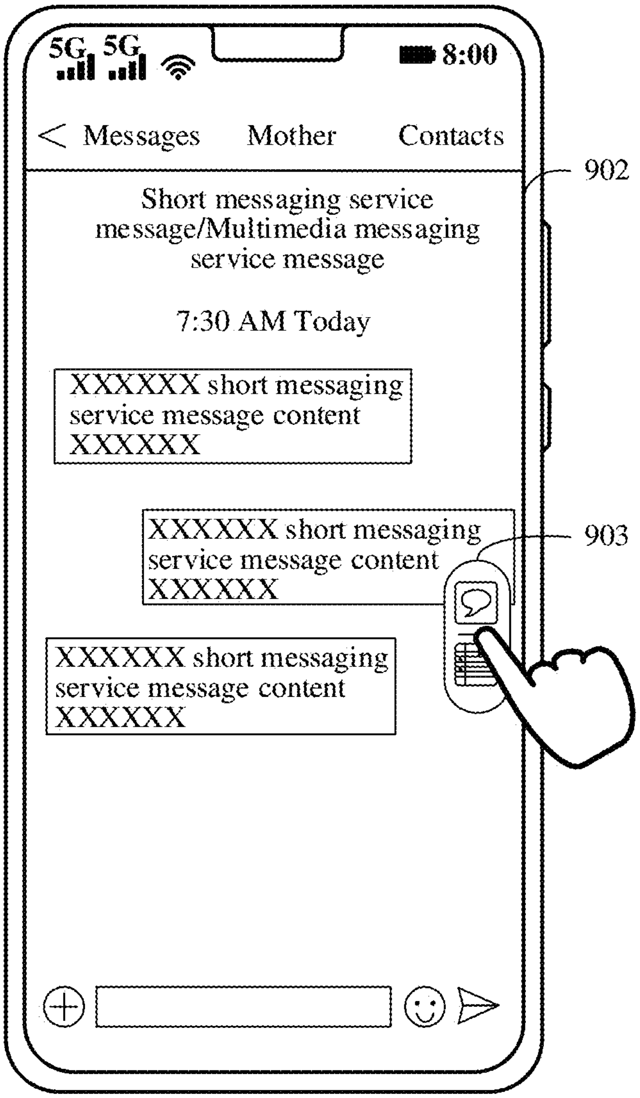
Figure 9D:
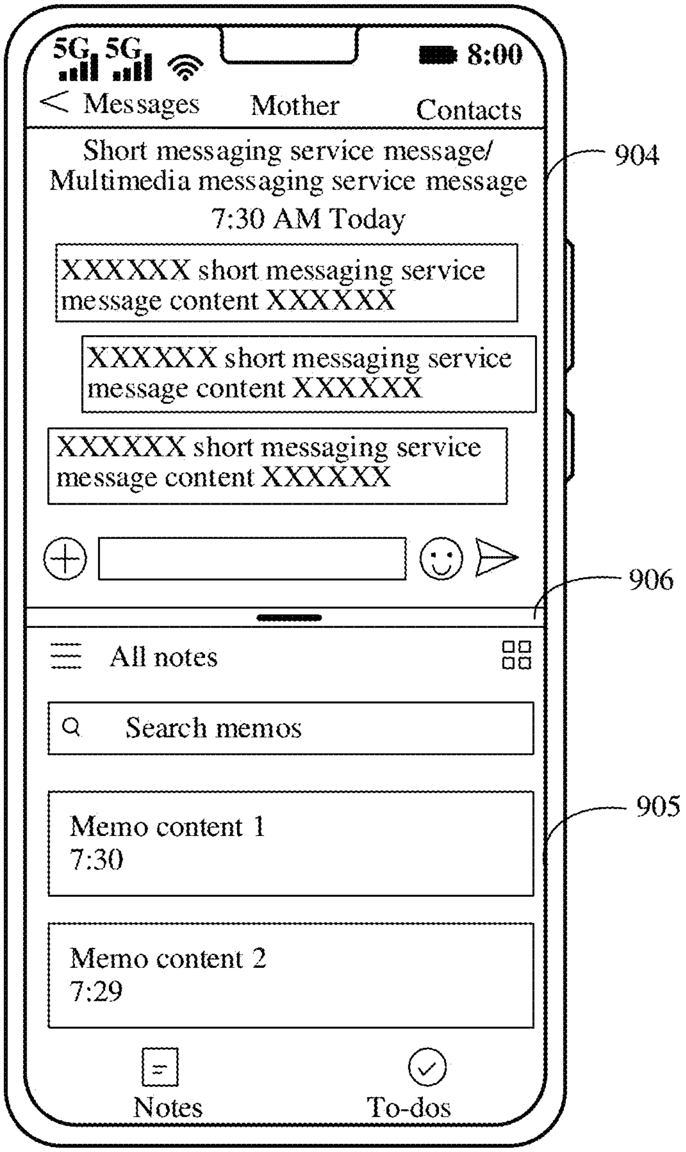

The foldable screen phone is used as an example for description in the foregoing. When the user uses a bar-type mobile phone (or a foldable screen phone with a horizontal splitting screen), because a width of the bar-type mobile phone (or the foldable screen phone with a horizontal splitting screen) is short, user experience is poor in a case of vertical screen splitting. Therefore, for the bar-type mobile phone, a horizontal split-screen manner is used. For example, as shown in FIG. 9A and FIG. 9B, it is detected that the user switches frequently between an interface 901 of Memo application and an interface 902 of Messages application. As shown in FIG. 9C, when the mobile phone displays the interface 902 of Messages application, a floating capsule 903 may be displayed. In the floating capsule 903, an application icon of Messages application (a current application) is on an upper side, and an application icon of Memo application (an application in which switching is frequently performed between the application and the current application) is on a lower side. The application icons of Messages application and Memo application are separated by a horizontal line (or may be separated by text "enter split-screen"). As shown in FIG. 9D, in response to an operation that the floating capsule 903 is tapped by the user, the mobile phone may perform split-screen display on Messages application (a current application) and Memo application (an application in which switching is frequently performed between the application and the current application). An interface 904 of Messages application (the current application) may be displayed on an upper side of a mobile phone screen, and an interface 905 of Memo application (the application in which switching is frequently performed between the application and the current application) may be displayed on a lower side of the mobile phone screen. The interface 904 of Messages application and the interface 905 of Memo application may be separated by a splitting bar 906. Respective display positions of the interface 904 of Messages application and the interface 905 of Memo application on the mobile phone screen correspond to positions of an application icon of Messages application and an application icon of Memo application in the floating capsule. In other words, when the application icon of Messages application in the floating capsule is on the upper side, the interface of Messages application is displayed on the upper side of the mobile phone screen when split-screen display is performed. When the application icon of Memo application in the floating capsule is on the lower side, the interface of Memo application is displayed on the lower side of the mobile phone screen when split-screen display is performed.

Figure 10:
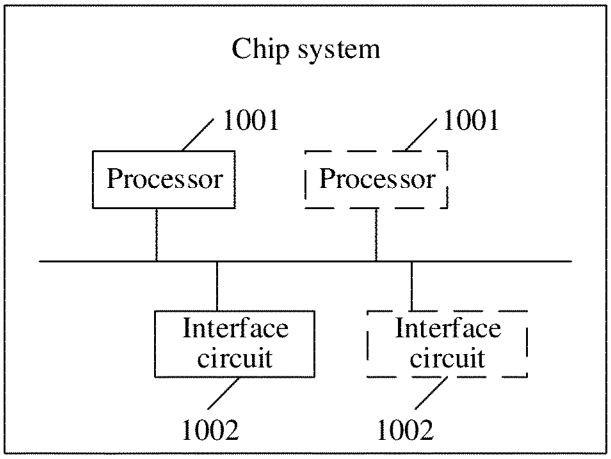
FIG. 10 is a schematic diagram of a structure of a chip system according to an embodiment of this application.

Embodiments of this application further provide a chip system. As shown in FIG. 10, the chip system includes at least one processor 1001 and at least one interface circuit 1002. The processor 1001 and the interface circuit 1002 may be connected to each other by using a line. For example, the interface circuit 1002 may be configured to receive a signal from another apparatus (such as a memory of an electronic device). In another example, the interface circuit 1002 may be configured to send a signal to another apparatus (for example, the processor 1001).

For example, the interface circuit 1002 may read instructions stored in the memory of the electronic device and send the instructions to the processor 1001. When the instructions are executed by the processor 1001, the electronic device (the mobile phone 100 shown in FIG. 1) may be enabled to perform the steps in the foregoing embodiments.

Certainly, the chip system may further include another discrete device. This is not specifically limited in embodiments of this application.

Embodiments of this application further provide a computer-readable storage medium. The computer-readable storage medium includes computer instructions. When the computer instructions are run on an electronic device (for example, the mobile phone 100 shown in FIG. 1), the mobile phone 100 is enabled to perform the functions or steps performed by the electronic device in the foregoing method embodiments.

Embodiments of this application further provide a computer program product. When the computer program product runs on a computer, the computer is enabled to perform the functions or steps performed by the electronic device in the foregoing method embodiments.

Embodiments of this application further provide a split-screen display apparatus. The apparatus may be divided into different logical units or modules based on functions. Each unit or module performs a different function, to enable the apparatus to perform the functions or steps performed by the electronic device in the foregoing method embodiments.

Through the foregoing descriptions about implementations, a person skilled in the art may clearly understand that, the foregoing functions may be allocated to different functional modules and implemented based on a requirement. To be specific, an inner structure of an apparatus is divided into different functional modules to implement all or some functions described above.

In the several embodiments provided in this application, it should be understood that the disclosed apparatus and method may be implemented in other manners. For example, the described apparatus embodiment is merely an example. For example, division into module or unit is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separated. A part displayed as a unit may be one or more physical units, that is, may be located at the one position, or may be distributed to different positions. Some or all of the units may be selected based on actual needs to achieve the objectives of the solutions of this embodiment.

In addition, functional units in embodiments of this application may be integrated into one processing unit, each of the units may exist alone physically, or two or more units may be integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to conventional technologies, or all or some of the technical solutions may be implemented in a form of a software product. The software product is stored in a storage medium and includes several instructions to enable a device (which may be a single-chip microcomputer, a chip, or the like) or a processor (processor) to perform all or some of the steps of the methods described in embodiments of this application. The foregoing storage medium includes: any medium that may store program code, such as a USB flash drive, a removable hard disk, a read only memory (read only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be used as protection scope of the claims.

The invention claimed is:

1. An electronic device, comprising a processor, wherein the processor is coupled to a memory, the memory stores program instructions that, when executed by the processor, cause the electronic device to perform operations comprising:

displaying a first interface of a first application in full screen at a first moment, wherein at the first moment, an application list comprises first application information of the first application;

displaying a second interface of a second application in full screen at a second moment, wherein at the second moment, the application list comprises the first application information of the first application and second application information of the second application, and the second moment is later than the first moment;

displaying a third interface of a third application through a floating window at a third moment, wherein at the third moment, the application list comprises the first application information of the first application and the second application information of the second application and does not comprise third application information of the third application, and the third moment is later than the second moment;

displaying a split-screen floating window at a fourth moment, wherein the split-screen floating window comprises an icon of the first application and an icon of the second application, the first application and the second application are applications between which switching is frequently performed and that are determined by the electronic device based on application information in the application list, a quantity of application information in the application list reaches a first threshold between the third moment and the fourth moment, and the fourth moment is later than the third moment; and in response to an operation on the split-screen floating window, displaying a fourth interface and a fifth interface in split-screen at a fifth moment, wherein the fourth interface corresponds to the first application information, the fifth interface corresponds to the second application information, the fifth moment is later than the fourth moment, and the electronic device continues to display the third interface through the floating window from the third moment to the fifth moment.

2. The electronic device according to claim 1, wherein the first application information comprises a first package name corresponding to the first application and a first task identification corresponding to the first interface;

the second application information comprises a second package name corresponding to the second application and a second task identification corresponding to the second interface; and/or the third application information comprises a third package name corresponding to the third application and a third task identification corresponding to the third interface.

3. The electronic device according to claim 1, wherein before the displaying a first interface of the first application in full screen at a first moment, the operations further comprise:

adding the first application information to the application list in chronological order; and before the displaying a second interface of the second application in full screen at a second moment, the operations further comprise:

adding the second application information to the application list in chronological order.

4. The electronic device according to claim 1, wherein the program instructions, when executed by the processor further cause the electronic device to perform operations comprising: after the displaying a third interface of the third application through a floating window at a third moment, switching the third interface in the floating window to the third interface displayed in full screen at a sixth moment, wherein at the sixth moment, the application list comprises the third application information, and the sixth moment is later than the fifth moment.

5. The electronic device according to claim 1, wherein the program instructions, when executed by the processor further cause the electronic device to perform operations comprising: after the displaying a third interface of the third application through a floating window at a third moment, switching the third interface to a sixth interface of the third application in the floating window at a seventh moment, wherein at the seventh moment, the application list does not comprise the third application information, and the seventh moment is later than the fifth moment.

6. The electronic device according to claim 1, wherein the program instructions, when executed by the processor, further cause the electronic device to perform operations comprising:

displaying the third interface through the floating window when the electronic device displays the first interface of the first application in full screen at the first moment, wherein at the first moment, the application list does not comprise the third application information; and/or displaying the third interface through the floating window when the electronic device displays the second interface of the second application in full screen at the second moment, wherein at the second moment, the application list does not comprise the third application information.

7. The electronic device according to claim 1, wherein the program instructions, when executed by the processor further cause the electronic device to perform operations comprising:

switching the first interface to an interface of a desktop application at an eighth moment, wherein the eighth moment is later than the first moment and earlier than the second moment, and at the eighth moment, the application list comprises the first application information and does not comprise application information of the desktop application.

8. The electronic device according to claim 1, wherein the program instructions, when executed by the processor, further cause the electronic device to perform operations comprising, after the quantity of the application information in the application list reaches the first threshold, determining that the first application and the second application are applications between which switching is frequently performed, wherein occurring frequency of the first application information in the application list is equal to a second threshold, and occurring frequency of the second application information in the application list is equal to the second threshold.

9. The electronic device according to claim 1, wherein the program instructions, when executed by the processor, further cause the electronic device to perform operations comprising: after the quantity of the application information in the application list reaches the first threshold, determining that the first application and the second application are applications between which switching is frequently performed, wherein a quantity of times of switching back and forth between the first application information and the second application information in the application list reaches a third threshold.

10. The electronic device according to claim 1, wherein the first application information in the application list is the first application information added by the electronic device at the first moment, and the program instructions, when executed by the processor further cause the electronic device to perform operations comprising:

displaying the first interface of the first application in full screen at a ninth moment, wherein the ninth moment is later than the first moment; and adding the first application information to the application list at a tenth moment, wherein a difference between the tenth moment and the first moment is less than or equal to a first time.

11. The electronic device according to claim 10, wherein the program instructions when executed by the processor further cause the electronic device to perform operations comprising: after the displaying the first interface of the first application in full screen at a ninth moment, adding the first application information to the application list, wherein application information added before the first time in the application list is deleted, and the difference between the tenth moment and the first moment is greater than the first time.

12. The electronic device according to claim 1, wherein the split-screen floating window further comprises prompt text, and the prompt text indicates a user to enable a split-screen function.

13. The electronic device according to claim 1, wherein the split-screen floating window floats on a side of an interface in which the split-screen floating window is located.

14. The electronic device according to claim 1, wherein the fourth interface is located on a left side of a screen of the electronic device, and the fifth interface is located on a right side of the screen of the electronic device, wherein the icon of the first application is located on a left side of the split-screen floating window, and the icon of the second application is located on a right side of the split-screen floating window; or the fourth interface is located on a right side of a screen of the electronic device, and the fifth interface is located on a left side of the screen of the electronic device, wherein the icon of the first application is located on a right side of the split-screen floating window, and the icon of the second application is located on a left side of the split-screen floating window.

15. The electronic device according to claim 1, wherein the program instructions, when executed by the processor further cause the electronic device to perform operations comprising: after the displaying a split-screen floating window at a fifth moment, if it is detected that a user does not click/tap the split-screen floating window within a preset duration, automatically closing the split-screen floating window.

16. The electronic device according to claim 1, wherein the electronic device is a foldable screen phone.

17. A split-screen display method, comprising:

displaying a first interface of a first application in full screen at a first moment, wherein at the first moment, an application list comprises first application information of the first application;

displaying a second interface of a second application in full screen at a second moment, wherein at the second moment, the application list comprises the first application information of the first application and second application information of the second application, and the second moment is later than the first moment;

displaying a third interface of a third application through a floating window at a third moment, wherein at the third moment, the application list comprises the first application information of the first application and the second application information of the second application and does not comprise third application information of the third application, and the third moment is later than the second moment;

displaying a split-screen floating window at a fourth moment, wherein the split-screen floating window comprises an icon of the first application and an icon of the second application, the first application and the second application are applications between which switching is frequently performed and that are determined based on application information in the application list, a quantity of application information in the application list reaches a first threshold between the third moment and the fourth moment, and the fourth moment is later than the third moment; and in response to an operation on the split-screen floating window, displaying a fourth interface and a fifth interface in split-screen at a fifth moment, wherein the fourth interface corresponds to the first application information, the fifth interface corresponds to the second application information, the fifth moment is later than the fourth moment, and the third interface is continually displayed through the floating window from the third moment to the fifth moment.

18. The method according to claim 17, wherein after the displaying a third interface of the third application through a floating window at a third moment, the method further comprises:

switching the third interface in the floating window to the third interface displayed in full screen at a sixth moment, wherein at the sixth moment, the application list comprises the third application information, and the sixth moment is later than the fifth moment; or switching the third interface to a sixth interface of the third application in the floating window at a seventh moment, wherein at the seventh moment, the application list does not comprise the third application information, and the seventh moment is later than the fifth moment.

19. The method according to claim 17, wherein the method further comprises:

switching the first interface to an interface of a desktop application at an eighth moment, wherein the eighth moment is later than the first moment and earlier than the second moment, and at the eighth moment, the application list comprises the first application information and does not comprise application information of the desktop application.

20. The method according to claim 17, wherein the first application information in the application list is the first application information added by the ek at the first moment, and the method further comprises:

displaying the first interface of the first application in full screen at a ninth moment, wherein the ninth moment is later than the first moment;

adding the first application information to the application list at a tenth moment wherein a difference between the tenth moment and the first moment is less than or equal to a first time; or adding the first application information to the application list, wherein application information added before the first time in the application list is deleted, and the difference between the tenth moment and the first moment is greater than the first time.

* * * * *